United States Patent [19]

Herron

[11] Patent Number: 4,712,424
[45] Date of Patent: Dec. 15, 1987

[54] QUANTITATIVE DETERMINATION BY ELEMENTAL LOGGING OF SUBSURFACE FORMATION PROPERTIES

[75] Inventor: Michael M. Herron, Danbury, Conn.

[73] Assignee: Schlumberger Technology Corp., New York, N.Y.

[21] Appl. No.: 656,104

[22] Filed: Sep. 28, 1984

Related U.S. Application Data

[63] Continuation-in-part of Ser. No. 574,481, Jan. 26, 1984.

[51] Int. Cl.⁴ ............................................. E21B 49/00
[52] U.S. Cl. ..................... 73/152; 250/256; 250/270
[58] Field of Search ................. 73/152; 364/422, 498; 250/256, 253, 269, 270

[56] References Cited

U.S. PATENT DOCUMENTS

| | | | |
|---|---|---|---|
| Re 30827 | 12/1981 | Pelet et al. | 73/152 |
| 3,336,476 | 8/1967 | Richardson | 250/256 |
| 3,590,228 | 6/1971 | Burke | 364/422 |
| 3,930,153 | 12/1975 | Scott | 250/270 |
| 3,976,878 | 8/1976 | Chavalier et al. | 250/253 |
| 4,055,763 | 10/1977 | Antkiw | 250/270 |
| 4,071,755 | 1/1978 | Supernaw et al. | 250/253 |
| 4,095,102 | 6/1978 | Tixier | 250/265 |
| 4,096,385 | 6/1978 | Marett | 250/262 |
| 4,263,509 | 4/1981 | Fertl et al. | 250/255 |
| 4,317,993 | 3/1982 | Hertzog, Jr. et al. | 250/270 |
| 4,369,497 | 1/1983 | Poupon et al. | 364/422 |
| 4,436,997 | 3/1984 | Allen | 250/256 |
| 4,446,369 | 5/1984 | Givens et al. | 250/270 |
| 4,464,569 | 8/1984 | Flaum | 250/270 |
| 4,464,930 | 8/1984 | Givens | 73/152 |
| 4,475,038 | 10/1984 | Lochmann et al. | 250/270 |
| 4,484,470 | 11/1984 | Fertl et al. | 73/152 |
| 4,573,354 | 3/1986 | Voorhees et al. | 73/432 R |

OTHER PUBLICATIONS

W. C. Savre, Determination of More Accurate Porosity and Mineral Composition in Complex Lithologies with the Use of the Sonic, Neutron, and Density Surveys, Sep. 1963, *J. Pet. Tech.*

Poupon, A. et al., Log Analysis of Sand-Shale Sequences—A Systematic Approach, *J. Pet. Tech.*, (Jul. 1970, pp. 867-881).

Poupon, A. et al., Log Analysis in Formations with Complex Lithologies, *J. Pet. Tech.*, (Aug. 1971, pp. 995-1005).

Lock, G. et al., Natural Gamma-Ray Spectral Logging, *The Log Analyst*, (Sep.-Oct. 1971, pp. 3-9).

Roberts, H. et al., The Application of Coriband to the Micaceous Jurassic Sandstones of the Northern North Sea Basin, 3rd Ann. European Formation Eval. Symp., (Oct. 1974).

Tardy, Yves, Element Partition Ratios in Some Sedimentary Environments, Sci. Geol. Bull. 28, 1. (Strasbourg, 1975, pp. 59-95).

(List continued on next page.)

Primary Examiner—Stewart J. Levy
Assistant Examiner—Scott M. Oldham
Attorney, Agent, or Firm—David G. Coker; David P. Gordon

[57] ABSTRACT

Methods are disclosed which provide for quantifying and characterizing the mineral content of a formation as a function of depth. Elemental data derived from logging tools are input into an element-mineral transform operation, preferably a matrix which is constructed using multivariate statistical analysis on previously available data, to determine the quantity of at least one or more dominant minerals in the formation. From the mineral quantity information and the elemental log data, the formation minerals are further characterized. Information regarding the character and quantities of formation minerals is further used to obtain improved determinations of formation characteristics such as the cation exchange capacity and water saturation, and the grain density and formation porosity, as well as to obtain an increased understanding of the formation such as the depositional environment of the formation. A determination of formation characteristics and an increased understanding of the formation are both vital to production decisions concerning the formation.

48 Claims, 24 Drawing Figures

OTHER PUBLICATIONS

Ruckebusch, G., An Application of Kalman Filtering in Nuclear Well Logging, Proc. ICASSP 82, (1982, vol. 3, pp. 1866–1869).

Millhone, R., Completion Fluids for Maximizing Productivity-State of the Art, J. Pet. Tech., (Jan. 1983, pp. 47–55).

Burck, L., A. Review of Log and Core Methods for Determining Cation Exchange Capacity/Qv. Trans. of 8th European Formation Evaluation Sympos., (Mar. 1983, London).

Everett, R., et al., Log Responses and Core Evaluation Case Study Technique Field and Laboratory Procedures, SPWLA 24th Ann. Logging Symp., (Jun. 1983).

Hodgson, M. and Dudney, William L., "Estimation of Clay Proportions in Mixtures by X-Ray Diffraction and Computerized Chemical Mass Balance", *Clays and Clay Minerals*, vol. 32, No. 1, pp. 19–28, 1984.

Pearson, "Quantitative Clay Mineralogical Analyses from the Bulk Chemistry of Sedimentary Rocks", *Clays and Clay Minerals, vol. 26, No. 6, pp. 423–433, 1978.*

Gold et al., "Clay Minerals in Mixtures: Sample Preparation, Analysis and Statistical Interpretation", *Clays and Clay Minerals*, vol. 31, No. 3, 1983, pp. 191–199.

Imbrie, et al., "Mineral Compositions Calculated from Chemical Analyses of Sedimentary Rocks", *Journal of Sedimentary Petrology*, vol. 29, No. 4, Dec. 1959, pp. 588–595.

Mestdagh, et al., "Iron in Kaolinite: II. The Relationship between Kaolinite Crystallinity and Iron Content", *Clay Minerals*, vol. 15, 1980, pp. 1–13.

Peveraro et al., "Interpretation of Wireline Log and Core Data from a Mid-Jurassic Sand/Shale Sequence", *Clay Minerals*, vol. 19, 1984, pp. 483–505.

Miesch, A. T., "Computing Mineral Compositions of Sedimentary Rocks from Chemical Analysis", *Journal of Sedimentary Petrology*, vol. 32, No. 2, Jun. 1962, pp. 217–225.

Desborough, et al., "Concentration and Mineralogical Residence of Elements in Rich Oil Shales of the Green River Formation, Piceance Creek Basin, Colorado, and the Uinta Basin, Utah-A Preliminary Report", *Chemical Geology*, vol. 17, 1976, pp. 13–26.

QUANTITATIVE DETERMINATION BY ELEMENTAL LOGGING OF SUBSURFACE FORMATION PROPERTIES

This application is a continuation-in-part of application Ser. No. 574,481, filed Jan. 26, 1984.

The subject matter of this invention is related to subject matter disclosed in U.S. patent application Ser. No. 574,753 of Michael Herron and Jeffrey Schweitzer, filed on Jan. 26, 1984 and assigned to the same assignee of the present invention.

BACKGROUND OF THE INVENTION

The present invention relates generally to investigating earth formations traversed by a borehole. More particularly, the invention relates to methods for determining values for and for further characterizing the attributes of a formation surrounding a borehole by processing well logging data derived by lowering in the borehole one or more apparatus for investigating subsurface earth formations. The ability to assign values for (e.g. quantify) and further characterize formation attributes (e.g. formation minerals) permits a wide range of new and improved results to be obtained through logging, including a direct calculation of cation exchange capacity (CEC) and a corrected water saturation (Sw) determination, an oil API gravity log, an improved grain density and porosity determination, an improved understanding of depositional environment, a permeability log, a log of mean grain size, a log of thermal neutron capture cross-section and a log of formation elements not directly measurable, among others.

Quantitative knowledge of the lithological constituents present in a well as a function of depth would be valuable in assessing all aspects of exploration, evaluation, production, and completion. A complete shaly sands lithological description must go beyond simple discrimination between "sands" and "shales" and, for example, establish the quantity of clay minerals in all layers including so-called "clean sands", identify and quantify the non-clay as well as clay minerals present, and identify subtle and pronounced changes in depositional or diagenetic facies by characterizing the formation minerals.

Until now, it has been generally accepted that there are no successful techniques available for taking elemental chemical data and deriving therefrom a quantitative mineralogical analysis of the lithology in question. Some procedures have been posed for gaining limited knowledge of lithology from chemical data, and different logging tools have been utilized to provide elemental data and indicators, but none of the previously known procedures or tools, alone, or together, have been capable of broadly and accurately permitting quantitative mineralogical analysis from logging. The known techniques and procedures generally only address the derivation of particular outputs such as water saturation, porosity, carbon/oxygen ratios, cation exchange capacities, general lithology classifications, etc.

Examples of borehole tools which provide and determine elemental chemical data and yields include natural gamma ray tools, induced gamma spectroscopy tools and high resolution spectroscopy tools. The natural gamma ray tools typically comprise a scintillator and pulse height analyzer which respond to and measure the gamma ray activity due to the decay in an earth formation of the naturally radioactive elements: thorium, uranium and potassium. In the past, the thorium plus potassium content has been used as an indication of clay or shale content. Uranium amounts have been suggested to indicate organic carbon sources and to provide information regarding secondary porosity detection and fractures. See e.g. U.S. Pat. No. 4,071,755 issued to Supernaw et al. As detailed by Lock, G. A. and Hoyer, W. A., "Natural Gamma-Ray Spectral Logging," The Log Analyst, September-October 1971, pp. 3-9, a thorium/uranium ratio may in some instances provide insight into the type of marine environment encountered. A potassium percentage determination may provide in some instances an indication of potash deposits or micaceous sands.

Induced gamma ray spectroscopy tools typically utilize a pulsed deuterium-tritium accelerator neutron source and sodium iodide detectors, which detect the gamma rays resulting from the interaction of the source neutrons with the formation elements. As disclosed in U.S. Pat. No. 3,521,064 issued July 21, 1970 to Moran and U.S. Pat. No. 4,055,763 to Antkiw, the spectroscopy tools can be run either in an inelastic or an activation mode and provide elemental yield information on hydrogen, chlorine, silicon, calcium, iron, oxygen, carbon and sulfur. Using various ratios of the determined elements, indicators such as fluid salinity, porosity, shaliness, lithology and oxygen activation, among others, may be determined.

High resolution spectroscopy tools are based on the same principles as the induced gamma ray spectroscopy tools except that the accelerator neutron source may be replaced, if desired, by a chemical source, and the detectors utilized are high resolution (such as high-purity germanium) detectors. The high resolution (or enhanced resolution) spectroscopy tools (see Everett, R., Herron, M. and Pirie, G., "Log Responses and Core Evaluation Case Study Technique Field and Laboratory Procedures" *SPWLA 24th Annual Logging Symposium*, June 27-30, 1983 pp. 23-24), may be used to determine both the amounts of the more abundant formation elements such as those determined by the induced gamma ray spectroscopy tools, and the amounts of less abundant elements such as aluminum, vanadium, magnesium, sodium, etc.

From the information gathered by the tools disclosed above, as well as other tools known in the art including electrical resistivity tools, sonic exploration tools, and other nuclear tools such as the gamma-gamma (formation density tool), or neutron-neutron (neutron porosity tool) tools, many attempts have been made to comprehensively evaluate and interpret lithology, including systems for two-mineral interpretation and shaly sands interpretation. Some systems such as SARABAND and CORIBAND (registered trademarks of Schlumberger Technology Corporation, described respectively in Poupon, A. et al., "Log Analysis in Formations with Complex Lithologies", *J. Pet. Tech.* (Aug. 1971) pp. 995-1005 and Poupon, A. et al. "Log Analysis of Sand-Shale Sequences—A Systematic Approach" *J. Pet. Tech.* (July, 1970)), correct porosity and resistivity logs for borehole and mudcake effects and then correct for the influence of clay, and/or shale content, and the effects of light hydrocarbons, etc. before computing porosity, matrix density, water saturation, movable hydrocarbon saturation, etc. Other techniques for shaly sand interpretation include the Waxman-Smits approach in which clay conductivity is used for a determination of water saturation. Clay conductivity is expressed in terms of cation exchange capacity (CEC), per unit volume, $Q_v$. However, as shown in Burck, Lockhart, J. S., "A Review of Log and Core Methods for Determining Cation Exchange Capacity/$Q_v$", *Transactions of the Eighth European Formation Evaluation Symposium* (London, England Mar. 14–15, 1983), unless constant minerology and salinity are assumed, conventional logging cannot provide a satisfactory determination of $Q_v$. Moreover, the Waxman-Smits approach cannot be said to provide a comprehensive evaluation and interpretation of lithology.

Another approach to lithology evaluation has been to analayze formations through core analysis. Thus, core analysis has been used to determine CEC or $Q_v$. A summary of the different core measurement techniques is provided in the aforementioned Burck article including both destructive (pulverizing) and non-destructive techniques. In addition, core analysis has been utilized in conjunction with logging to correlate radioactive elements to cation exchange capacity. In U.S. Pat. No. 4,263,509 issued on Apr. 21, 1981 to Fertl et al., it was suggested that the cation exchange capacity determined by the laboratory testing of a cored borehole could be correlated to a function of the natural gamma rays detected by logging the said borehole. Natural gamma ray logging operations in subsequent boreholes within the same geological region would then provide, in conjunction with the predetermined function, an in situ estimation of the depth related cation exchange capacity of the subsequent borehole. Such a technique is of limited utility, however, because cation exchange capacity is being correlated to elements which generally have little global relation to the clay minerals which dictate cation exchange capacity.

Core analysis has also been used by geochemists in the analysis of depositional environments. One analysis technique is called "factor analysis" and is extensively described in Joreskog, K. G., Klovan, J. E. and Reymont, R. A., *Geological Factor Analysis,* Elsevier Scientific Publishing Company (Amsterdam, the Netherlands 1976). Factor analysis is a technique which can be used in geochemistry to take multiple data sets of variables such as elemental concentrations and to correlate and anticorrelate the variables such that the subject rock or formation can be described with a good degree of certainty by a small number of independent factors which can be identified. Factor analysis has been used in the past to correlate elements to desired outputs such as aerosol sources and air pollution. Thus, the detection of an increase in the abundance of the element lead would indicate increased local usage of fossil fuels. In such a correlation, score analysis is utilized to determine how the magnitude of the factors changes from sample to sample.

Factor analysis was used in conjunction with regression analysis in Tardy, Yves, *Element Partition Ratios in Some Sedimentary Environments,* Sci. Geol. Bull. 28, 1, p. 59–95 (Strasbourg, 1975), to classify a formation and to solve for the distribution of trace elements among the classified fractions of a rock. Thus for example, in a particular core sample set, by factor analysis, forty variables were correlated such that four groups (rock fractions) were identified: detrital, sulfide, phosphate (apatite) and organic carbon. Through the use of regression analysis, the distribution in ppm of the trace elements among the four groups was determined. Also, by analyzing results from twenty-one other sets of shale and sandstone core samples, a study of the occurrence of trace elements in identified principal rock fractions was accomplished with the resulting conclusions that environmental conditions such as weathering, deposition and diagenesis might be determinable from a determination of trace elements in the rock formation.

While the interpretation of logging results and of core data have provided many useful outputs to help describe and evaluate lithology, no techniques have been provided which can permit a comprehensive and accurate analysis of a formation by determining from initial log inputs the values for or quantities of the formation attributes such as formation minerals.

It is therefore an object of the invention to provide methods for taking log data as input and providing values for the attributes of the formation under investigation.

It is a further object of the invention to provide methods for taking log data as input and providing a mineralogical analysis including both a quantitative determination and a characterization of the minerals in the formation under investigation.

It is yet a further object of this invention to provide methods for taking log data as input and providing a quantitative determination and a characterization of the clays present in the formation under investigation.

Another object of the invention is to provide a shaly sands interpretation technique which accounts for clays present in the formation.

Yet other objects of this invention are to provide methods for the analysis of depositional environment and production risks as well as improved calculation of CEC, water saturation, permeability, mean grain size and capture cross-section from the quantitative determination and characterization of minerals provided by this invention.

SUMMARY OF THE INVENTION

There are broadly provided, in accordance with the invention, methods for determining the values of formation attributes wherein a borehole in the formation is logged by induced nuclear spectroscopy in order to determine the concentration of elements, an element-to-attribute transform is constructed, and the log data is used as input into the element-to-attribute transform to provide a determination of values for the attributes of the formation. Typically, the attributes will be formation minerals.

The invention also provides methods for investigating, through logging, an earth formation traversed by a borehole in which elements and attributes likely to occur in the formation are identified, and an element-attribute transform linking the identified attributes and elements is constructed, by modifying a predefined transform in accordance with the known geology of the formation. The borehole is logged to determine the elemental concentrations of the elements, and then the attributes for one or more depths of the borehole are quantified by applying the element-attribute transform to the elemental concentrations. The transform may be modified upon the basis of comparison of the quantified attributes with the measurements obtained by other logging operations in the borehole.

Information regarding the character and quantities of formation minerals in turn may further be used to obtain improved determinations of formation characteristics as well as an increased understanding of the formation, both of which are vital to production decisions concerning the well and the entire oil field. Thus, for example, the quality of oil in the reservoir may be measured by the API gravity which is a function of the vanadium in the oil. Because vanadium is found not only in oil, but in shales, it is impossible to determine the API gravity of the oil in situ without first determining the vanadium content of the shales. By using the method invention summarized above, the quantities of various clay minerals containing vanadium are determined, and in turn through linear regression, the vanadium content of each of those minerals is determined. Any residual vanadium detected by the logging tool may then be attributed to the oil. From the determined vanadium content of the oil, in conjunction with other information such as oil saturation, formation porosity, and fluid density, the vanadium concentration in the oil and hence oil API may be determined.

Likewise, other elements occurring in the formation may be quantified, whether they are directly measurable by logging or not. The elemental quantifications thereby obtained can themselves be used to derive values for such formation properties as thermal neutron capture cross-section.

Another example of improved determination of formation characteristics from the mineral quantity determination invention is the possibility of directly calculating cation exchange capacity and hence water saturation from logs. Since it may be assumed that only clay minerals adversely affect a water saturation determination by contributing to the CEC, a determination (using the method invention) of the different clay contents is helpful. By assuming that the rock CEC is a linear additive function of the content of each clay mineral, the formation CEC and its consequent impact on resistivity readings may be determined. Hence, an improved water saturation reading is available.

Grain density can likewise be determined, as can formation properties which have no direct counterpart in relation to individual minerals, such as permeability and mean grain size.

An understanding of the formation which may be vital to hydrocarbon production may also be gained by a knowledge of the formation mineral characteristics. Thus, for example, the presence of a high iron-illite would dictate the avoidance of acidization as a producing technique because an iron-oxide gel would be produced which could seal the formation. On the other hand, if the illite was characterized as a low-iron illite, acidization techniques could be utilized.

BRIEF DESCRIPTION OF THE DRAWINGS

Additional objects and features of the invention will become more apparent upon consideration of the following detailed description of the invention when taken in conjunction with the accompanying drawings wherein.

DETAILED DESCRIPTION

As stated in the Background and Summary, this invention provides a determination of values for the dominant attributes of a formation by logging a borehole in the formation to determine indications of indexers, constructing an indexer-to-attribute transform, and by inputting the log data into the indexer-to-attribute transform to provide the determination of values for the dominant attributes. It should be understood at the outset that an "indexer" is something which relates to the formation or borehole environment and which correlates well with an attribute of the formation. While, for purposes of simplicity and best mode, chemical elements (index elements) will be the only indexers mentioned and used throughout this application, the term "indexer" shall not be limited to only chemical elements but shall include any data derived by a logging tool or otherwise (such as pressure, temperature, dip, permeability, resistivity, shear or compressional wave characteristics, etc.) provided it correlates with a formation attribute.

It should also be understood that a formation "attribute" is something which describes the formation under investigation. While for purposes of the best mode and simplicity, formation minerals will be the only attributes of the formation considered, the term "attribute" shall include other descriptors such as fractures, grain size, permeability, porosity, formation processes such as diagenesis and uranium decay, etc. In assessing an attribute, a value may be assigned to that attribute. When the attribute is a mineral, the "value" normally takes the form of a quantity determination.

Figure 1:
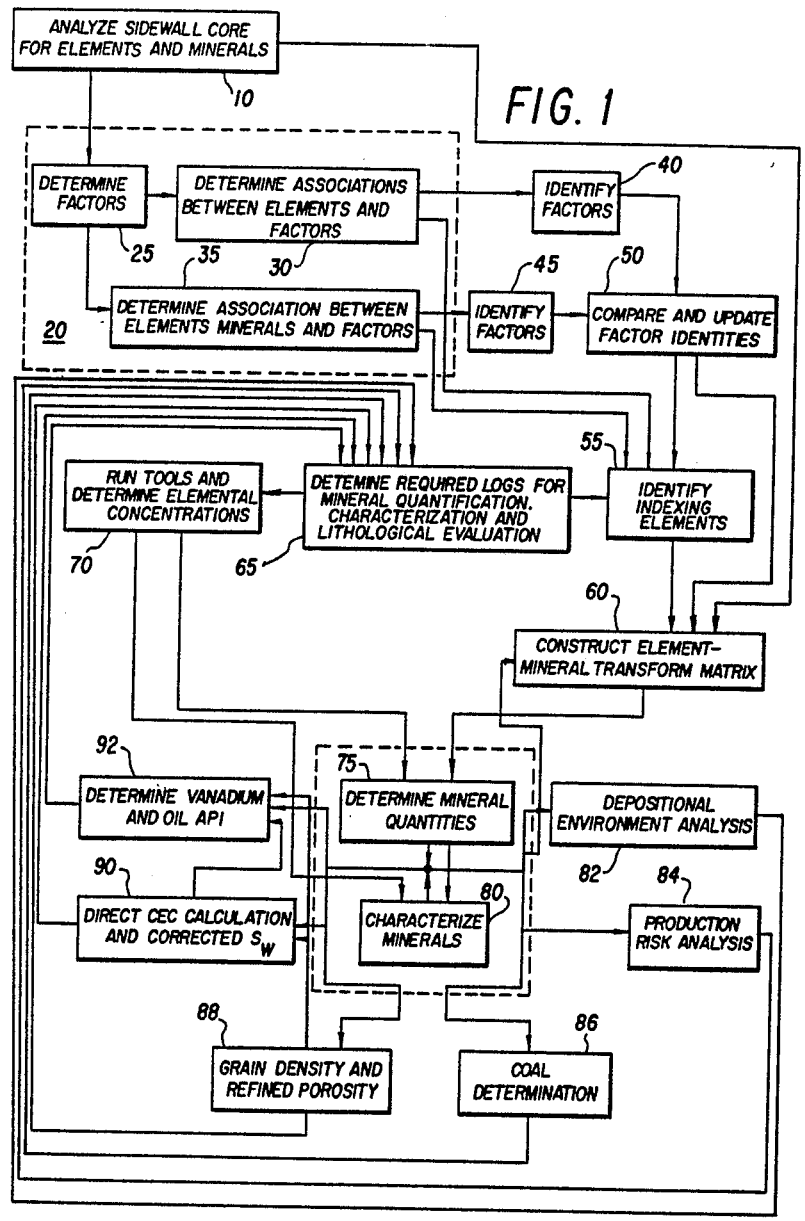
FIG. 1 is a flow diagram representing the invention for determining mineral quantities and further characterizing the formation minerals from logs.

Turning to FIG. 1, a method is provided in flow diagram format for taking logging data input from a borehole, and therefrom determining values for and further characterizing formation attributes as a function of borehole depth to provide valuable information for exploration, evaluation, production, and completion of the borehole and oil field. While FIG. 1 uses the terms "index elements" and "minerals", it should be understood as aforementioned that the invention is broader and that an index element is one type of indexer just as a mineral is one type of formation attribute.

Figure 4A:
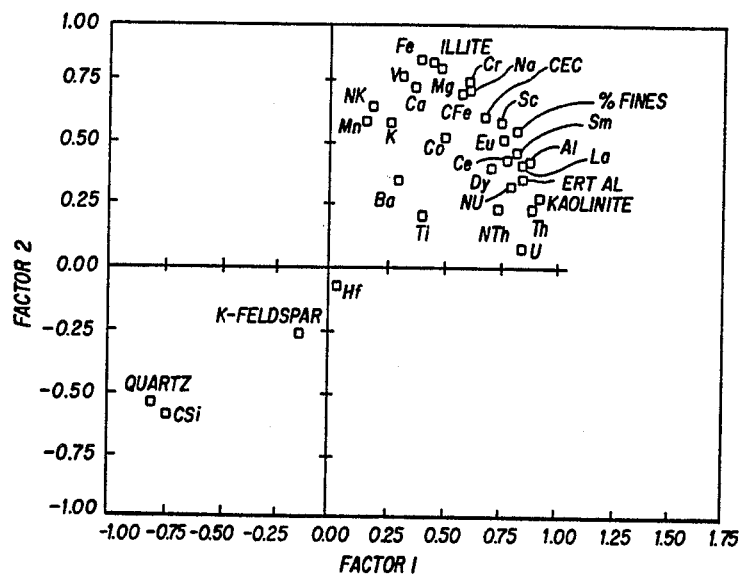
FIGS. 4a, 4b and 4c are factor analysis cross plots wherein various formation elements, minerals, log responses and formation properties are plotted in relation to different factors.
Figure 4B:
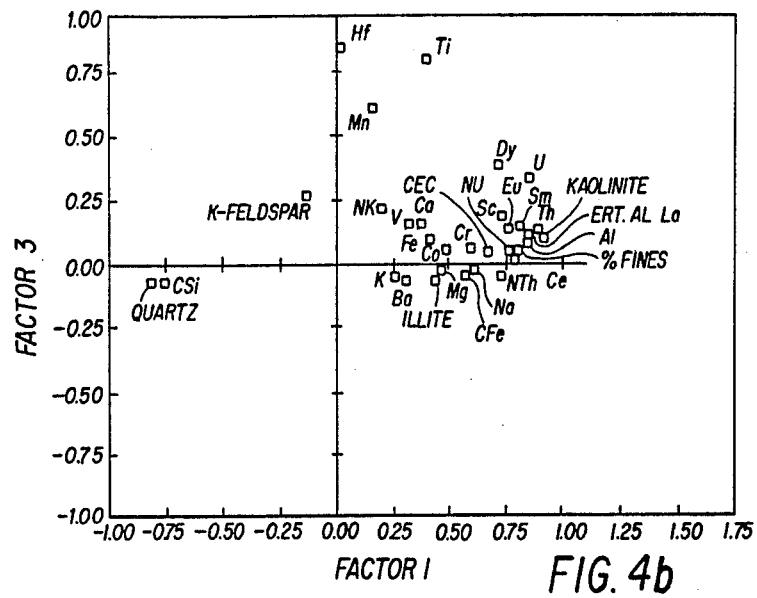
Figure 4C:
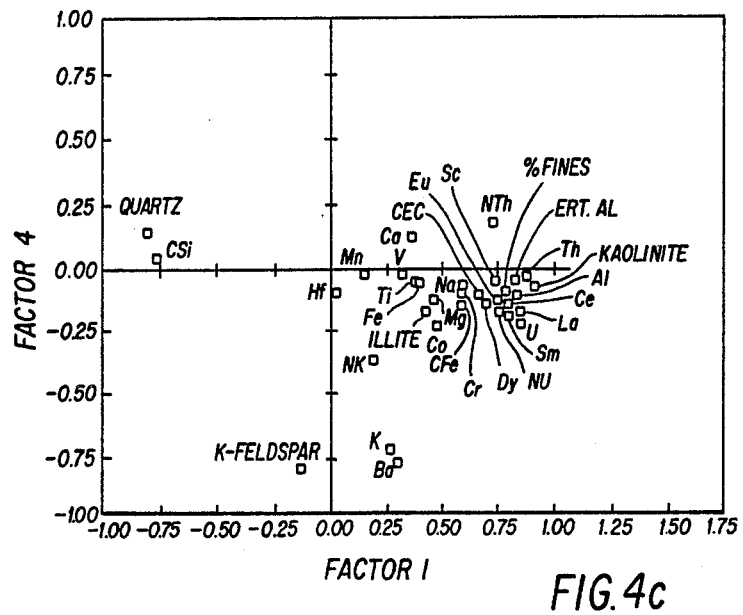

In most oil fields, sidewall or whole cores from one well bore are available for analysis. In one embodiment of this invention, the sidewall or whole cores are analyzed at 10 for elemental and mineralogical content (and if desired for other attributes such as resistivity, permeability, etc. and other possible indexers such as porosity, etc.) via standard laboratory techniques such as X-ray diffraction, fines (less than 20 micron) separation, instrumental neutron activation analysis, cation exchange capacity determinations, etc. Each sidewall core represents a complete data set of variables which includes a list of minerals and elements (and other attributes and possible indexers) located therein and an absolute and-/or relative concentration of the elements and minerals, etc. (Reference to indexers and attributes generally will be omitted hereinafter, elements and minerals being representative thereof respectively.) The available information, preferably comprising numerous data sets, is input into computer 20 which performs an r-mode factor analysis to reveal common sources of correlation, if any, between the measured variables. If desired, the factor analysis may be carried out in a two-stage manner. Thus, at 25, the major factors which account for a large percentage of the variance among the elements are determined. Associations between the elements and factors are determined at 30, and factor cross-plots as seen in FIGS. 4a, 4b, and 4c are output by the computer. The chosen factors may then be identified at 40 as discussed hereinafter. As a check on the factor analysis results, the factor determination may be reviewed by determining at 25 the major factors which account for a large percentage of the variance among the elements and the minerals. Association between the elements, minerals and factors is thus accomplished at 35, and another set of factors is identified at 45. The factors identified at 40 are then compared at 50 to those identified at 45. If they are identical, the determined factors are confirmed with certainty. If the comparison at 50 yields different factor identifications, those identified at 45 are utilized, and it is assumed that bad data from geochemically anomalous zones such as lignitic zones have thereby been screened. The factors, as discussed hereinafter, should preferably be chosen to be minerals to permit mineral quantification.

From the associations accomplished by the computer at 30 and 35, and the final factor determination at 50, index elements are chosen at 55 which can be used to establish a quantitative relationship between the elements and dominant mineral factors. The dominant factors and indexing elements are chosen in the following manner. From the sidewall core analysis at 10, a knowledge is gained of the important minerals in the formation. Because it is desirable to be able to quantify and characterize the minerals in the formation, the minerals should be related to the factors. Thus, it is possible that a dominant mineral will be located close to a factor axis on a cross-plot and will correlate well to the factor (as kaolinite in FIG. 4a may be seen to lie near the Factor 1 axis with a 0.9 correlation). In that ideal case, the factor can be described in terms of the single dominant mineral e.g. "kaolinitic", and a single element located near the factor axis or near the mineral and indicating good correlation with the mineral factor may be used to index the mineral. If the mineral is split among two factors, two elements are needed to index the mineral. One chosen index element should be located near one factor axis, while the second should be located near the other factor axis. In the unlikely event that a single element correlates extremely well with that particular mineral and no other mineral (i.e. the element is located adjacent the mineral in all factor space), two indexing elements are not needed and the single well-correlating indexing element may be used.

Thus, the core data analyzed at 10 is utilized in conjunction with the mineral factors and indexing elements at 60 to provide an element-mineral transform matrix $$[M] = [A]^{-1} \cdot E \tag{1}$$

which transforms the concentration of the index elements into the weight percentage of the dominant factor minerals. $[M]$ is the column matrix of mineral abundances. $[E]$ is the column matrix of elemental concentrations in each sample. $[A]^{-1}$ is the inverse of the end member composition matrix which is determined through a multiple linear regression of the concentrations of index elements (chosen at 55) in conjunction with the factor mineral weight percentages gained from the sidewall or whole core analysis at 10.

While the invention has been described as using an element-mineral transform matrix, those skilled in the art will recognize that the invention simply requires a transform. Thus, simultaneous equations may be used in lieu of a matrix, or, if desired, transforms for non-linear equations may be used. Likewise, while factor analysis is used as the preferred technique, other multivariate statistical techniques may be used. Those skilled in the art will also appreciate that the tasks performed by a computer may vary greatly due to evolving artificial intelligence techniques. Thus, a computer may not be used at all, may be used for calculation only, or may be used for "decision-making" as well as for calculation.

Although exemplary embodiments of the invention will be described hereafter in terms of identifying dominant minerals and index elements by means of factor analysis of data derived from, for example, sidewall core samples, this is not an essential part of the invention. It is believed that the chemical composition of sedimentary minerals of the same degree of crystallinity, at least, is uniform, irrespective of their geographical origin. Thus, for example, it appears that all medium-crystallinity illites anywhere in the world have the same chemical content. This hypothesis, called geochemical uniformity, is contrary to established geochemical theory, in which the chemical composition of minerals, and especially clays, is considered to be extremely variable. It now appears that much of the variability seen in laboratory measurements can be ascribed to sources other than variation in chemical content, in particular to substantial errors (frequently ±50%) in clay analyses and to the use of mineral 'standards' which are in reality mixtures of several different mineral phases.

Figure 10:
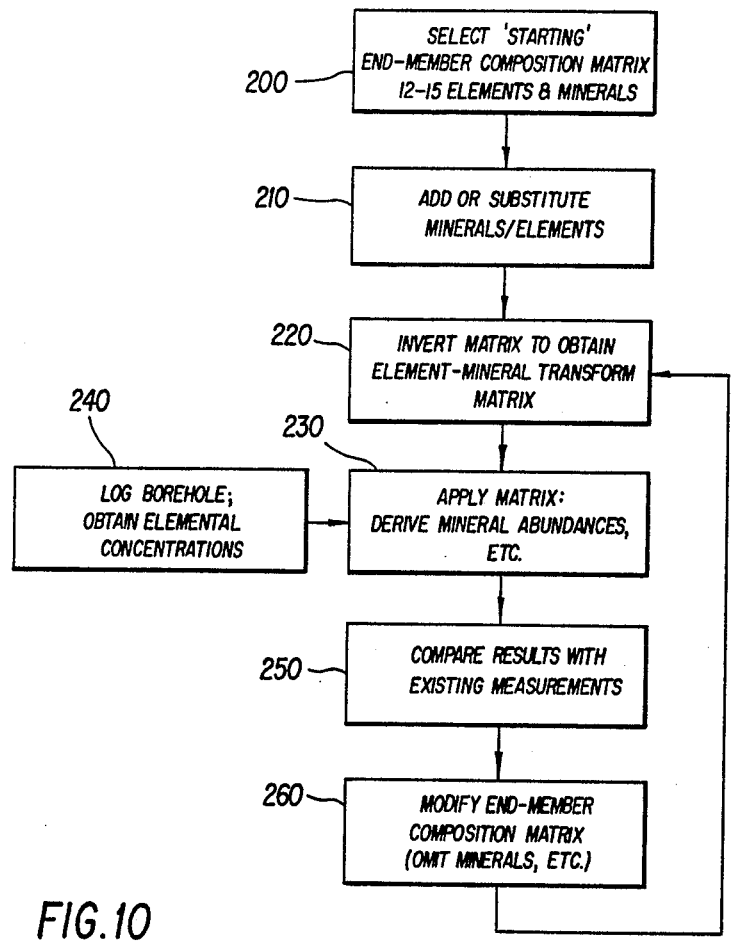
FIG. 10 is a flow diagram representing a modified way of deriving an element-mineral transform matrix.

A consequence of the concept of geochemical uniformity is that core samples and factor analysis, for example, are not necessarily essential to the construction of the required element-mineral transform matrix, although they may of course be used if desired. Thus, as depicted in FIG. 10 at 200, a standard 'starting' matrix relating say 12–15 index elements to a similar number of minerals known to occur on a widespread basis in formations of interest may be constructed, using the constant chemical formula for each mineral selected for inclusion. The quantities of each element in a given formula can be derived in a variety of ways known to those skilled in the art, such as measurement, regression analysis or maximum entropy spectral analysis (see for example the papers by I. Barrodale and R. E. Erickson in Geophysics, vol 45, no. 3, March 1980, pp. 420–432 and pp. 433–446). The results of existing factor analyses performed for boreholes previously studied may naturally be helpful in identifying minerals to be incorporated, together with the associated elements and the values to be incorporated in the matrix.

The choice of elements and minerals making up the starting matrix thus derived may be modified for a given oilfield, as at 210, on the basis of existing knowledge of the field. In most fields the geology, for example major mineral constituents, are already known to some degree. Thus it may be possible to select additional or substitute minerals and elements to be incorporated in the matrix for application in that field. This selection of elements and minerals may then be further modified in light of data already available, for example to incorporate elemental concentrations which can be derived from existing logs, and because of practical considerations, such as difficulty of running specific logging tools in prevailing borehole conditions. Obviously, factor analysis may be used in this process inasmuch as the basic data is available or obtainable.

The matrix thus obtained is an end member composition matrix [A], as discussed in relation to equation (1). The required element-mineral transform matrix $[A]^{-1}$ is then obtained by inversion of the matrix [A], depicted at 220.

Additional modifications may be made at 260 based upon comparison of other logging measurements, as at 250, with the results obtained by applying the element-mineral transform matrix, as at 230, in the manner hereinafter described to elemental concentrations obtained by logging at 240; thus, an evaluation of thermal neutron capture cross-section derived as explained hereinafter could be compared with a direct measurement of that parameter—a good degree of correlation would help confirm that appropriate selections of minerals and elements had been made. If any mineral in the starting matrix were evaluated as having zero concentration in a particular field, it could be concluded that that mineral was not significant in that field, and the matrix could be simplified, for that field, by removal of that mineral. The modified end-member matrix would be inverted, as at 220, and re-tested if desired, leading to the definition of a working element-mineral transform matrix.

Once the element-mineral transform matrix (operation) is in place, the well under study, or other wells, especially those expected to have similar geological characteristics, e.g. in close proximity, may be extensively investigated. First, a decision must be made at 65 as to which logs are necessary. The decision regarding which tools to run downhole depends upon both (a) which elements have been chosen as indexing elements such that elemental concentrations of them are required as input into the element-mineral matrix; and (b) what final results or indicators are desired, e.g. oil API, grain density etc. Thus, for example, if the indexing elements include potassium, iron, and sulfur, and the final results desired include an oil API log as well as a coal determination log, a natural gamma radiation tool together with an induced gamma spectroscopy tool and an enhanced resolution gamma spectroscopy tool could provide logs of the required elements. Thus, the natural gamma radiation tool would provide the potassium concentrations, while the induced gamma spectroscopy tool could provide concentrations of iron, sulfur and silicon, the last being required as discussed hereinafter for the coal determination. Finally, the enhanced resolution spectroscopy tool would provide a log of vanadium concentration required for an oil API log.

After determining which logs will be required to provide a quantification and further characterization of the minerals as well as the desired output results, the logs are run at 70 and elemental concentrations are determined by preprocessing the log information. Thus, the output spectrum acquired by an induced gamma spectroscopy tool can be processed according to a least squares fitting technique to provide an iron yield according to the teachings of the commonly-owned U.S. Pat. No. 3,521,064 issued July 21, 1970 to Moran. Then, to take the iron yield from the gamma spectroscopy tool and output an iron concentration, the iron yield is divided by the iron plus calcium plus silicon yields and that ratio is used to cross-plot core and log data from which a yield-to-concentration algorithm may be developed for iron. A similar algorithm is developed for the aluminum yields by plotting the log information against the core data for aluminum. To determine potassium concentrations, the natural gamma ray spectrum may be Kalman filtered and divided into five contiguous windows for processing according to the teaching of commonly-owned U.S. Pat. No. 3,976,878 issued Aug. 24, 1976 to P. Chevalier et al. and an article by Ruckebusch, G. "An Application of Kalman Filtering in Nuclear Well Logging," *IEEE International Conference in Acoustics, Speech & Signal Processing*, Vol 3, 1982.

For each investigated station in the borehole (or along the entire length thereof), the elemental concentrations determined by the processing of the tool data gathered are input into the determined element-mineral transform matrix, with the resulting determination at 75 of the quantitative amounts of the dominant minerals at each depth. (If indexers or attributes other than elements and minerals are used, the values or indications assigned to those indexers and attributes are input into an indexer-to-attribute transform which need not be linear, with a resulting value determination of the attributes.) Additionally, by using the logs to determine concentrations of whatever elements may be observed, the determined elemental concentration information may be combined with the mineral quantity information to characterize the minerals at 80. Thus, while a formation may be said to contain certain amounts of kaolinite and illite, it may be desirable to determine whether or not the located kaolinites or illites are typical. For example, non-marine illite typically contains a magnesium concentration of 0.7%. If the illite can be characterized as having a magnesium concentration of 2.1%, a marine depositional environment is strongly indicated.

Mineral quantification 75 and characterization 80 may be used as feedback to help in the construction of the element-mineral transform matrix. Thus, for example, if, due to the mineral characterization and processing of the derived information, it is believed that a mineral such as illite should be divided into a marine and a non-marine illite, the element-mineral transform matrix must be expanded to include an additional mineral and indexing element.

While mineral quantification and characterization are desirable goals in themselves, the present invention permits a broad range of new and improved determinations to be made on the investigated formation using mineral quantification and/or characterization as a starting point. As depicted in FIG. 1 by the dotted line around 75 and 80, and discussed above, an improved depositional environmental analysis 82, a production risk analysis 84, a coal determination 86, grain density measurements and refined porosity indications 88, direct CEC calculations and corrected water saturation readings 90, and a vanadium content and oil API log 92 can all use the mineral quantification and/or characterization method invention as a starting point. Indeed, those skilled in the art will recognize that other new and/or improved results will be made possible due to the method invention disclosed above.

A depositional environment analysis 82 is important as it provides one key in determining where next to drill in the oil field. The quantities and character of the minerals determined to be present adjacent a borehole provides the necessary information for such an analysis. (See Reineck, H. E. and Singh, I. B.; *Depositional Sedimentary Environments*, 2 ed., Springer-Verlag (New York 1980), for an in-depth discussion on depositional environment analysis). Thus, as discussed above, the character of the illite would provide information regarding marine environments. Similarly, an increase in the kaolinite/illite ratio would suggest a more alluvial depositional environment.

Mineral characterization 80 is also important in an analysis of production risks 84. Production techniques are well described in Millhone, R. S., "Completion Fluids for Maximum Productivity—State of the Art"; *Jour. Pet. Tech.*, pp. 47–55 (1983). Determining which production technique is suitable or optimal for a particular well might depend on the minerals of the formation. Thus, the existence of high iron clays suggests that production may not be accomplished through acidization techniques. On the other hand, the presence of smectite in the formation would rule out other production techniques which may cause smectite to swell and clog the formation pores, rendering the well totally useless and unsalvageable.

One common dominant mineral in earth formations is quartz ($SiO_2$). In quantifying the formation minerals, quartz will often be a factor mineral. However, in many circumstances, quartz may be assumed to be the residual when all other major minerals are determined. In that case, quartz will not be a factor mineral present in the element-mineral matrix, but its quantity is determined as unity minus the sum of other derived minerals. In comparing this quartz residual to a silicon log such as from the induced gamma spectroscopy tool, the quartz residual will closely follow the silicon log except in a coal zone (or other zone containing low concentrations of silicon and all index elements). In this manner, coal zones will be evidenced at 86 by a divergence of the two logs. As an alternative, the element-mineral transform matrix can be expanded to include index elements for quartz and/or coal outputs.

Figure 2:
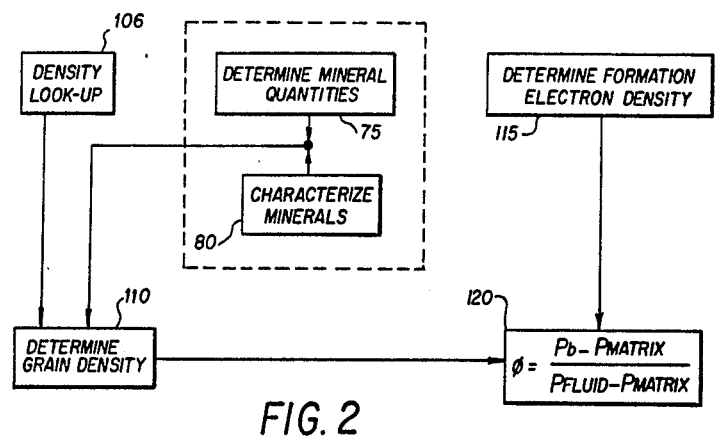
FIG. 2 is a flow diagram representing a method for providing a refined porosity determination.

Turning to FIG. 2, a method for providing a refined porosity determination is seen in flow diagram form. Thus, at 75 and 80, in accord with the method invention for quantifying and characterizing minerals from log information as described above, the quantities of minerals are determined and characterized along the length of the borehole. From a knowledge of the mineral volumes and types, and using a look-up chart 105 or linear regression techniques on core data to determine the grain density of the particular types of minerals found in the formation, a summation at 110 of density times percentage for all the minerals found at a particular formation depth d will provide a grain or matrix density for the formation at that depth according to $$\rho_{matrix,d} = \sum_{m=1}^{n} \rho_m q_m \qquad (2)$$

where $\rho_m$ is the density and $q_m$ is the relative quantity of the m'th mineral. Thus, a log of the matrix density will be available. A determination of the formation bulk density is accomplished at 115 by any suitable means such as an electron density tool, many of which are known in the art. (See, e.g. commonly-owned U.S. Pat. Nos. 3,864,569 to Tittman and 4,048,495 to Ellis.) A refined porosity log may then be determined at 120 according to the equation $$\phi = \frac{\rho_b - \rho_{matrix}}{\rho_{fluid} - \rho_{matrix}} \qquad (3)$$

where $\phi$ is the porosity, $\rho_b$ is the bulk density determined at 115, and $\rho_{matrix}$ is the grain or matrix density determined at 110. The fluid density, $\rho_{fluid}$, is taken to equal unity in the absence of other information. Thus by providing a quantification and characterization of the minerals in the formation over the length of the borehole, an improved matrix density log and hence an improved porosity log results.

In a similar technique to the density summing method described above for an improved porosity determination, the cation exchange capacity and hence the water saturation of the formation along the depth of the borehole may be determined at 90. To derive a whole rock CEC, it is assumed that only clay minerals contribute to the rock CEC, that each clay has a defined CEC over the entire profile, and that the whole rock CEC is a linear additive function of the clay mineral content. Thus, the quantity and character of the clay minerals in the formation are determined at 75 and 80 according to the method invention as described above. From a knowledge of the clay types and amounts, and using either a look-up chart or information gained from the analysis of core data, a CEC value is assigned to each clay type, and a whole rock CEC is determined by taking a summation of the CEC value for each clay type found at the formation depth times the clay type percentage for each of the clays. From the CEC determination, the CEC per unit pore volume, or $Q_v$, may be determined according to the well-known equation $$Q_v = \frac{CEC(1 - \phi)\rho_{matrix,d}}{\phi} \qquad (4)$$

where the matrix density and porosity at each borehole depth may be gained from the grain density and refined porosity determination described above, or by other means, if desired. In turn, a log of the water saturation of the formation over borehole depth may be gained from either or both $Q_v$ and the CEC according to the equations well-known in the art such as the Waxman-Smits equation or other equations described in Burck, Lockhart, J. S., "A Review of Log and Core Methods for Determining Cation Exchange Capacity /$Q_v$," *Transactions of the Eighth European Formation Evaluation Symposium* (London, England, Mar. 14–15, 1983). Thus, by providing a quantification and characterization of the minerals in the formation over the length of the borehole, a direct determination of CEC and $Q_v$, as well as a determination of water saturation at different borehole depths, can be made from logs.

The above-described derivations of values for the grain density and cation exchange capacity of the formation are examples of a general procedure, namely multiplying the quantity of each dominant attribute (mineral) at each borehole depth level by a respective value or coefficient, in this case representative of the value of a formation property for that attribute on its own (e.g. mineral grain density or clay CEC value), and then deriving a value for the formation as a function of the sum of the products of those multiplications.

Figure 11:
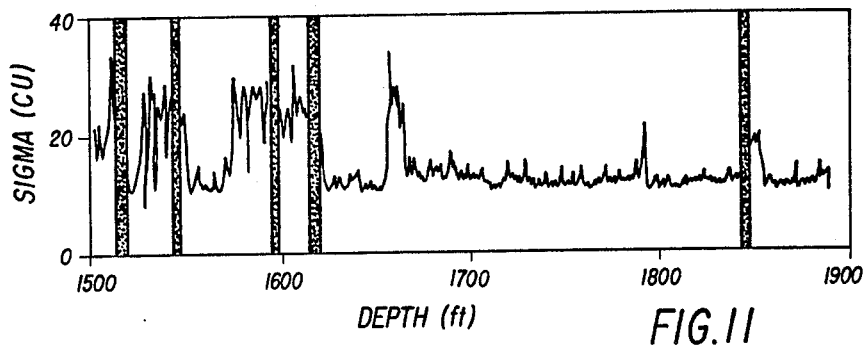
FIG. 11 is a log depicting thermal neutron capture cross-section in an examined borehole.

A similar derivation has been found to be possible for the thermal neutron capture cross-section, sigma, of the formation. One relationship that has been investigated is the following:

$$\text{Sigma} = (1 - \phi) \cdot [i(\text{wt \% quartz}) + j(\text{wt \% feldspar}) + \\ k(\text{wt \% calcite}) + m(\text{wt \% siderite}) + n(\text{wt \% kaolinite}) + \\ p(\text{wt \% illite}) + q(\text{wt \% smectite})] + S_f \cdot \phi \quad (5)$$

where $S_f$ is a value representative of the cross-section of the pore fluids (and may be for example the value for pure water), and $\phi$ is the formation porosity obtained for example as described above. Since all elements contribute to the neutron capture cross-section, rather more formation components appear in this formula than in others discussed herein. FIG. 11 shows a result obtained in this way, in which the solid line indicates the calculated values and the dotted line shows the values measured by logging. As in the cases noted above, values for the coefficients i through q may be determined for each mineral from a look-up chart or through regression analysis.

The same procedure is also applicable in the case of formation properties which have no direct counterpart in individual minerals. Examples of such properties are grain size and permeability. It has been discovered that there appears to be a correlative relationship between the mineral composition of a formation and properties of the formation, such as grain size and permeability, which depend on the physical history (for example sources, weathering and transport processes) of the formation. Thus, the clay minerals, such as kaolinite, illite and smectite, are, by their intrinsic nature, generally considerably smaller than 20 microns; they have now been found to be negatively correlated with permeability. Feldspars are known to be correlated with the silt to very-fine-grained sand particles in many sandstones, and have now been found to correlate with permeability. Heavy minerals have been found to correlate with fine grained to very fine grained sand. Further, it has been established that the abundances of minerals present in a formation can provide an indication of the mean grain size in the formation, using, for example, a linear combination of the following form:

$$\text{Grain size} = a(\text{wt \% kaolinite}) + b(\text{wt \% illite}) + c(\text{wt \% feldspar}) + d(\text{wt \% quartz}) + e(\text{wt \% smectite}) \quad (6)$$

Figure 12:
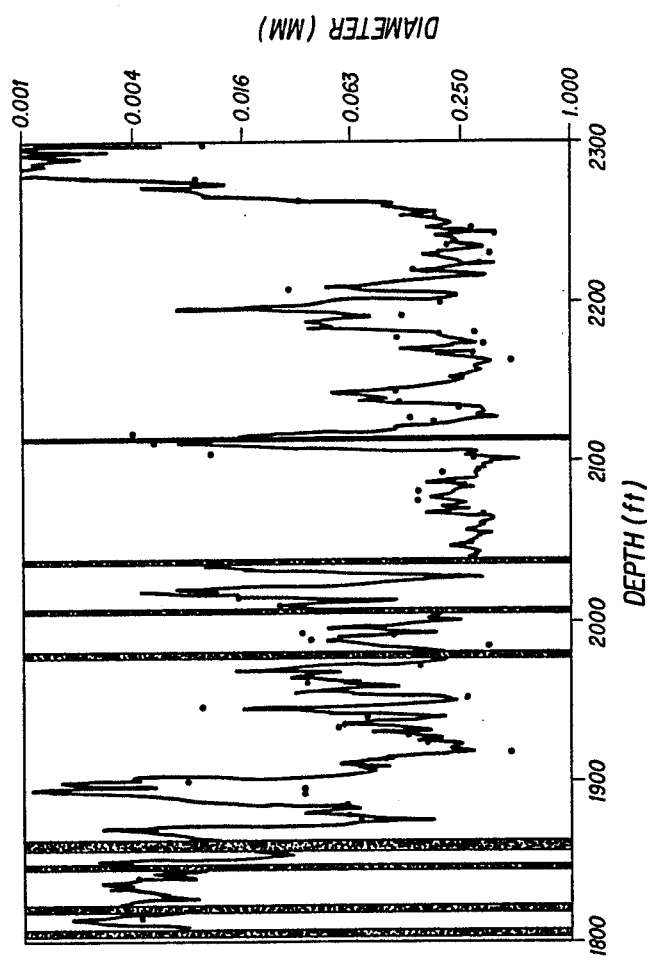
FIG. 12 is a log depicting mean grain size in an examined borehole.

This formula is one that has been investigated in practice for a particular borehole, resulting in the log shown in FIG. 12, in which the grain size calculated with the formula is shown as a continuous line and the dots show actual measured values. However, the exact number and identity of the minerals included may of course be varied depending on the particular nature of the formation under study. Appropriate values for the coefficients such as a, b, c, d and e for each mineral type in a particular borehole can be obtained by multiple linear regression analysis of the variations in mineral quantities and actual grain size measurements from sidewall core samples, for example. It has also been found that coefficients thus obtained are applicable not only in the sampled borehole but also in other boreholes. Depending on the similarity of the situation of the boreholes, an adjustment of selected coefficients or an overall scaling of all the coefficients may be required. Where an entirely different oilfield is the subject of the analysis, the required adjustment can be done by reference to existing logs and measurements of the relevant parameters (e.g. existing grain size analyses). Thereafter the adjusted coefficients can be applied to other boreholes in the new field.

In addition, the relationship between mineralogy and grain size makes possible a determination of permeability. Again, it has been found that, for example, a linear combination of mineral abundances provides a useful indication of permeability—one formula that has been investigated is as follows:

$$\text{Permeability} = f(\text{wt \% feldspar}) + g(\text{wt \% illite}) + h(\text{wt \% kaolinite}) \quad (7)$$

Figure 13:
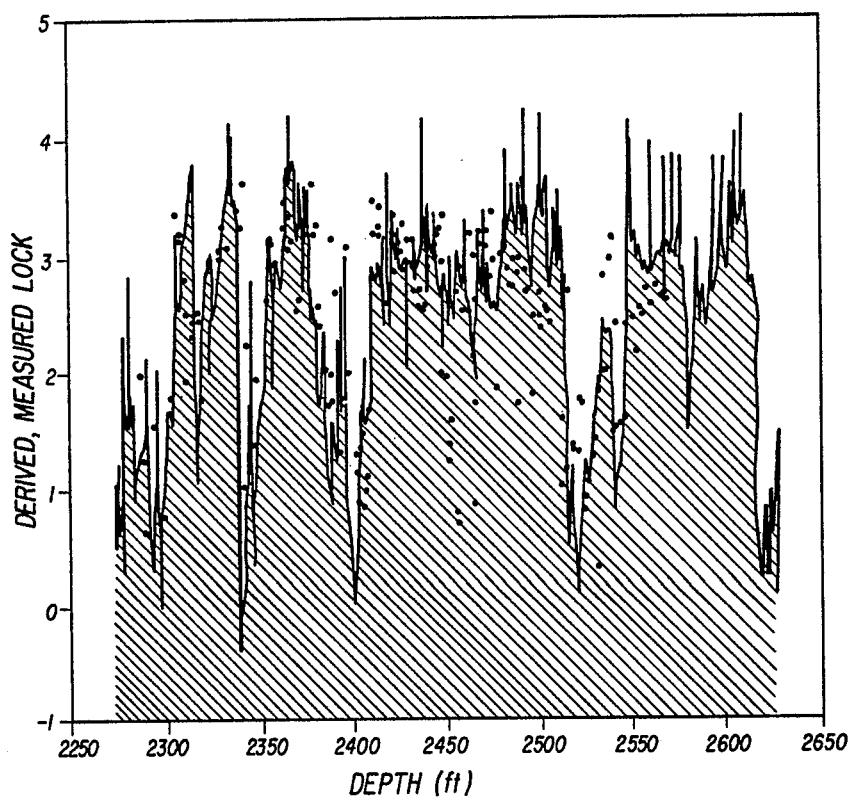
FIG. 13 is a log depicting permeability in an examined borehole.

A practical result obtained with this formula is shown in FIG. 13, the hatched area indicating the calculated value and the dots indicating actual laboratory measurements. As in the case of grain size, coefficient values f, g and h can be obtained by regression analysis of mineral abundances and permeability measurements, e.g. from sidewall core samples. Furthermore, such coefficient values, with appropriate scaling or individual adjustment (for example, of the feldspar coefficient to take account of overall feldspar content) as determined by comparison with existing logs and measurements, have been found to be applicable in other boreholes and other fields than the one for which they were derived.

Although the derivations of values for these formation properties have been described as separate steps of mineral quantification followed by derivation of formation property value, it will be apparent to those skilled in the art that these two steps can be combined, the coefficients being incorporated into the appropriate values for each mineral in the element-mineral transform matrix.

Logs of the matrix density and water saturation derived from the methods disclosed above can be used to help derive a log of the API gravity of oil in a formation. The equation $$\log V_{oil(ppm)} = C - (\text{API}/A) \quad (8)$$

relating oil vanadium concentration to API gravity has long been known in the art, where C and A are constants particular to given oilfields. One of the difficulties in deriving an API log, however, has been separating the determined vanadium content into vanadium content of the formation and vanadium content of the oil.

Figure 3A:
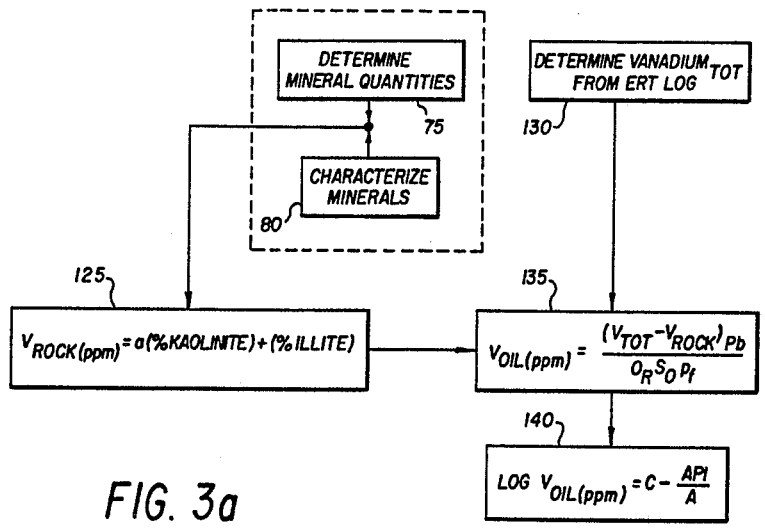
FIG. 3a is a flow diagram representing a method for determining the API gravity of oil in situ.

Turning to FIGS. 1 and 3a, and using the method invention for quantifying and further characterizing the minerals in the formation found over the length of the borehole at 75 and 80, as described above, the vanadium content of the rock minerals preferably is determined as follows: First, the minerals of the formation are characterized at 80 using factor analysis to determine which minerals include vanadium. Where it is determined, for example, that illite and kaolinite account for the vanadium content of the matrix, a multiple regression analysis is carried out using the core data provided to determine the relative weights to be given to each clay. Thus, the vanadium content in the matrix may be expressed at 125 by a simple linear function:

$$V_{rock(ppm)} = a(\text{wt \% kaolinite}) + b(\text{wt \% illite}) \quad (9)$$

where the values of a and b given by multiple linear regression might be 80 ppm and 250 ppm respectively. Thus, in utilizing the equation at 125, the mineral quantities of illite and kaolinite determined at 75 are transformed into a vanadium content of the rock matrix. The total vanadium content in the formation (which equals vanadium in the matrix plus vanadium in the oil) may be measured at 130 by an enhanced resolution gamma spectroscopy tool. The difference between the total vanadium and the rock vanadium is then attributed to the oil.

Figure 3B:
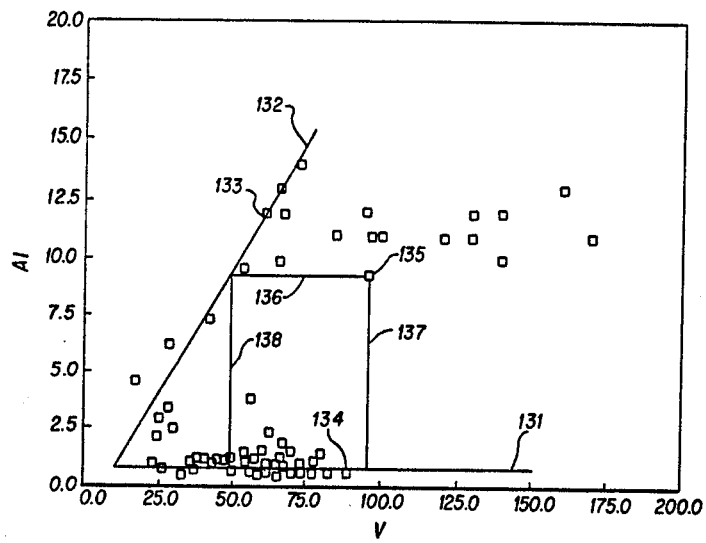
FIG. 3b is a cross plot of vanadium and aluminum concentrations used in one method for determining the API gravity of oil in situ.

The oil vanadium content ($V_{oil} = V_{TOT} - V_{rock}$) may also be derived in a simpler, though less accurate manner. If an assumption is made that the aluminum content of a formation is characteristic of the amount of clays in a formation, and a cross-plot, as seen in FIG. 3b is set up for plotting the aluminum versus vanadium content of the formation, from data derived from enhanced resolution tool readings, the derived points may be said to lie along or between two lines; a line 131 parallel and adjacent to the vanadium axis and a line 132 with a non-zero slope. Such a cross-plot indicates that the oil vanadium content may be determined as follows: The determined aluminum and vanadium contents from enhanced resolution tool readings are placed on the cross-plot as shown by points 133, 134 and 135. If the point, such as point 133 lies on the non-zero slope line, the vanadium is assumed to be totally from the matrix. If the point, such as 134 lies adjacent the vanadium axis, it is assumed that the vanadium content is from the oil. If the point falls between the lines, as does point 135, a horizontal line 136 is drawn to line 132 and two vertical lines are drawn; line 137 extending from point 135 to the vanadium axis, and line 138 from the intersection of lines 136 and 132 to the vanadium axis. The oil vanadium content may then be determined by subtracting the vanadium intercept of line 138 ($V_{TOT}$) from the vanadium intercept of line 137 ($V_{rock}$).

While the cross-plot technique for finding the oil vanadium content is simpler than the linear regression technique disclosed, it is less accurate as it is relying on only one element (aluminum) to provide information about the rock matrix. Thus, it is preferable to use additional elements such as found in the constructed element-mineral transform matrix to provide the information.

To convert the excess (non-matrix) vanadium derived by either method to an actual vanadium concentration (in ppm) of the oil, it is preferable to have accurate estimates of the formation porosity, matrix density, and oil saturation. Of course, the porosity ($\phi$) and the matrix or bulk density $\rho_b$, as well as fluid density $\rho_f$, may be determined according to the methods provided above at 88 or by other techniques known in the art. Likewise, oil saturation ($S_o$) may be derived from a determination of water saturation (from the CEC log) at 92 or from other well-known techniques such as a carbon/oxygen ratio from the gamma spectroscopy tool. Thus, assuming fluid densities equal to unity, the vanadium oil concentration is calculated at 135 by $$V_{oil\,ppm} = \frac{(V_{TOT} - V_{rock})\rho_b}{\phi S_o \rho_{fluid}} \quad (10)$$

Of course, if the oil density ($\rho_o$) is known, the bulk density term ($\rho_b$) of relationship (7) should be replaced by $\rho_b/\rho_o$.

The API gravity is then easily derived at 140 according to the well-known equation (8) above, where C and A are constants known for different oil reservoirs.

In sum, it is evident that an in situ determination of API gravity of the oil in a formation may be accomplished directly from logging data by following the method invention for determining mineral quantities and characterizing the minerals in the formation, by determining the vanadium content of the rock matrix through regression analysis or equivalent techniques, by subtracting the matrix vanadium content from the total vanadium detected to arrive at the oil vanadium content, by determining the oil vanadium concentration in parts per million from the oil vanadium content through use of other formation parameters, and by converting the oil vanadium concentration into API gravity. Alternatively, an in situ determination of API gravity of the oil in a formation may be accomplished directly from data, by plotting vanadium and aluminum concentrations on a cross-plot, by subtracting the matrix vanadium content from the total vanadium content by determining the oil vanadium concentration from the oil vanadium content through the use of other formation parameters, and by converting oil vanadium concentration into API gravity.

The above-described procedure for determining the matrix vanadium content, using equation (9), is an example of quantifying an element in the formation in accordance with a function of the quantities of selected minerals in the formation. The minerals selected are those which contain the element in question. Although the element can be one that is also directly measurable by logging, as in the case of vanadium, this is clearly not a requirement of the procedure. An element that is not directly measurable can also be quantified in the same manner, thereby increasing the range of elements that are quantifiable by borehole logging.

It is thus possible to quantify essentially all the elements occurring in a formation, either directly by measurement with appropriate logging tools, or by derivation as described above from mineral quantifications which are themselves derived from the elemental concentrations which are obtained by logging. The complete suite of elemental quantifications thus obtained in one or other manner can then be used, for example, in an alternative derivation of thermal neutron capture cross-section to that described earlier. The cross-section of a formation is the sum of the individual elemental cross-sections times the abundance of each element in the formation. Thus, given the complete set of elemental quantifications as described above, and standard values of individual elemental cross-sections, the composite formation cross-section can be obtained by multiplying each elemental quantity by the respective cross-section and summing the products, multiplying the sum by $(1-\phi)$ and adding the fluid cross-section multiplied by $\phi$.

Referring back to FIG. 1, the method invention for quantifying and characterizing formation minerals was practiced on two boreholes. Thus, one hundred twenty-four sidewall core samples were gathered from a first borehole. Instrumental neutron activation analysis was used on the uncleaned sidewall sample for the purpose of determining elemental content. The hydrocarbons from the samples were then removed by a sequential toluene-acetone-chloroform extraction technique in a Soxhlet apparatus. Following hydrocarbon removal, the samples were studied using binocular and petrographic microscopes, X-ray diffraction analysis, scanning electron microscopy, fines separation and cation exchange capacity techniques. Additionally, a natural gamma ray log, induced gamma spectroscopy logs (both capture and inelastic capture modes), and an enhanced resolution gamma spectroscopy log were taken at depths identical to the sidewall core depths. These logs were used to help determine the factors for the element-mineral transform matrix, which in FIG. 1, in essence, amounts to a feedback from 70 to 25. Such feedback is not necessary for practicing the invention. It should be noted, however, that the use of the logs 70 as input into 25 for determining factors could be considered sufficient to practice the invention if enough elements are detectable, and if assumptions are made concerning which minerals are likely to be encountered. It is also of note that where additional formation attribute and/or possible indexers are desired as input for factor analysis, the feedback from 70 to 20 is desirable. In this manner, pressure, temperature, dip, resistivity, etc. may be logged and used in an indexer-to-attribute transform.

From the sidewall core data and the logs, thirty-three variables for each borehole depth were obtained: four minerals, two formation characteristics (CEC and % fines) and twenty-two elements (five on which there were two readings due to a natural gamma ray (N) or enhanced resolution tool (ERT) log determination and a core determination).

The data sets of thirty-three variables were input into a computer which was programmed to perform a factor analysis. Samples very near lignitic zones were excluded since they were believed to be geochemically anomalous. The remaining information was subjected to an r-mode factor analysis, and the computer determined that four factors could account for approximately 85% of the variance in the samples. As output, the computer determined associations between the elements, minerals, formation characteristics and the factors as seen in FIGS. 4a–c.

FIG. 4a shows that Factors 1 and 2 accounted for most of the variability of elements commonly associated with shales, including Th, Al, Rare Earth Elements, Sc, Na, Cr, Fe, Mg, V and K. Presence of shales was also indicated in shaly sand sequences by high cation exchange capacities and a high percentage of fine-grained material as well as by an absence (anti-correlation) of Si and quartz. Thus, Factors 1 and 2 were identified as discriminating effectively between sands and shales.

Factors 1 and 2 were further characterized by more closely inspecting the variables associated with each. By inspecting FIG. 4a, Factor 1 may be seen to have high loadings of (i.e., a high degree of association with) kaolinite, the elements Al, Th, U, and the rare earths. X-ray diffraction analysis (XRD) confirms this observation. Thus, Factor 1 could be described as "kaolinitic". Factor 2, in contrast, may be seen, and may be confirmed by XRD to have higher loadings of illite and the elements Fe, V, Mg, K, Cr, and Na. These observations indicated a dominantly illitic character for Factor 2. The CEC and wt. % fines variables were somewhat intermediately loaded on both Factors, which was consistent with the fact that these characteristics related more to total clay minerals rather than to an individual species.

FIG. 4b shows factor matrix elements for Factor 1 plotted against those for Factor 3. Most of the variables relating to Factor 1 did not correlate well with Factor 3. The major variables associated with Factor 3 were Hf, Ti, and Mn, with a small degree of correlation with Dy, U, and K-Feldspar. Titanium, hafnium and zirconium are geochemically quite similar and characteristically are resistates or hydrolyzates. Hafnium is universally connected with zirconium in nature, the Zr/Hf ratio being a narrow 35–60 for a wide variety of rock types. By far the most common source of Hf and Zr is the resistive mineral zircon. Two samples with large Hf (and Zr) concentrations also showed a large relative enrichment in the heavier rare earths. This was consistent with the relative distribution coefficients in zircon favoring the smaller, heavier rare earths. Therefore, Factor 3 was identified as resistive and indicates intense weathering which has removed less stable elements and preferentially concentrated zircons.

FIG. 4c shows factor matrix elements for Factors 1 and 4. Factor 4 showed high loadings of Feldspar, and the elements K and Ba, as is visible from FIG. 4c and as was confirmed by XRD. Feldspars determined by XRD may be of the alkali or potassic varieties. The covariance between the XRD feldspar and the element K therefore strongly suggested that the mineral was potassium feldspar. Barium is not a structural component of feldspar, but is a ubiquitous impurity in potassium feldspar. Therefore, Factor 4 was identified as relating to potassium feldspar.

In sum, the major sources of variance in the data were identified at step 45 as being located in four factors which were identified as: kaolinite and inversely related to quartz; illite and inversely related to quartz, resistive minerals (typically containing zircon); and potassium feldspar. As no association was run between just the elements and factors, no preliminary factors were determined at 40, and thus, the factors identified at 45 were used as the final factors at step 50.

Having established that the variance of most of the variables could be simply related to identifiable minerals, step 55 required that index elements be found for each dominant mineral. As the quantity of resistive minerals was found to be insignificant, they were not considered dominant minerals. By inspecting the associations in FIGS. 4a, 4b and 4c, it was seen that the dominant mineral components, quartz, feldspar, kaolinite and illite could be fairly well-characterized by only three index elements: aluminium, iron and potassium. This was due to the inherent anticorrelation between each of the clay minerals and quartz. The concentrations of these index elements in each sample were then transformed at step 75 into weight percent of each mineral by constructing according to step 60, an appropriate matrix $[A]^{-1}$ as the inverse of a matrix $[A]$ whose components were the concentration of each element in each mineral. Thus, using multiple linear regression on the elemental concentrations provided by the XRD measurements at step 10, the relationships between the dominant minerals and the indexing elements for inclusion in the matrix [A] to be inverted were determined as follows:

|  | Al (%) | Fe (%) | K (%) |
| --- | --- | --- | --- |
| Kaolinite | 19.0 | 0.14 | 0.35 |
| Illite | 12.0 | 10.6 | 3.0 |
| Feldspar | 9.7 | 0.05 | 7.0 |

Thus, by determining the elemental concentration of aluminum, iron and potassium from logs, the dominant minerals in a formation adjacent the boreholes could be quantified. It should be appreciated by those skilled in the art that the above matrix is by way of example only for the particular investigated borehole, and that different minerals, index elements, or matrix percentages might be required depending upon the particular oil field circumstances. Moreover, those skilled in the art will also appreciate that the size of the matrix could be expanded or contracted in practicing the disclosed invention. Nevertheless, for the two investigated boreholes as well as for other boreholes in formations expected to have similar geological characteristics, the transform matrix stated above provides a way of determining dominant mineral quantities from elemental concentrations available from logs.

The identities of the indexing elements determined by the identifying step 55 dictated which tools should be run down-hole in the boreholes to gather information. Thus, it was determined at step 65 that a natural gamma ray tool could provide a potassium concentration, an induced gamma ray spectroscopy tool, the iron concentration, and an enhanced resolution spectroscopy tool, the aluminium concentration. In addition, because other end results were desired such as an oil API log, a direct CEC calculation and corrected water saturation reading, a grain density and refined porosity log, etc., it was decided to run additional tools such as a formation density tool which would provide a bulk density log, and a deep propagation tool which would provide a resistivity log.

Figure 5:
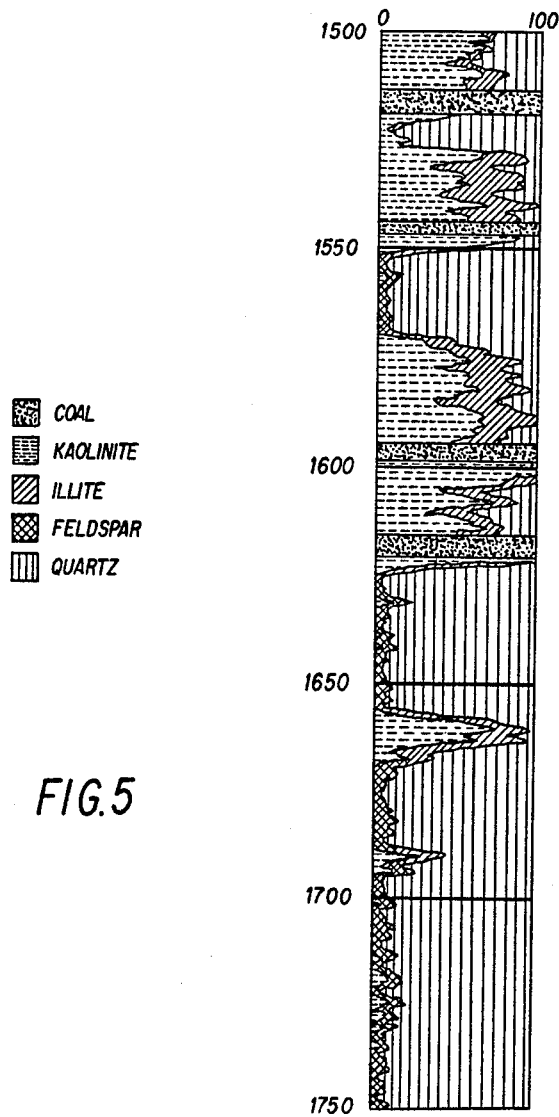
FIG. 5 is a log depicting the absolute percentage of dominant minerals in an examined borehole.

Using the elemental concentrations determined by the logging tools and known data processing techniques, and the element-mineral matrix previously derived, the quantities of the dominant minerals in the formation were determined. FIG. 5 depicts a log of the dominant mineral concentrations by well depth as generated and quantified by the instant invention. Thus, at depth 1580, a shale zone is depicted with 48% kaolinite, 25% illite, 0% feldspar, the remaining 27% assumed to be quartz.

From the mineral quantities and elemental concentrations, the minerals were further characterized in accord with step 80. For example, kaolinite and illite were further characterized according to their vanadium content as described hereinafter. Also, the kaolinite and feldspar elemental compositions were determined to be similar to look-up values. However, the illite composition appeared to be substantially different than the "average illite" (given by Weaver, C. E. and Pollard, L. D., *Developments in Sedimentology*; Elsevier Scientific Publishing Company, (New York, 1975)). In fact, the illite appeared to be somewhat similar to an atypical illite from weathered biotite which has concentrations of $K = 2.7\%$ and $Fe = 9.0\%$ and often indicates a mixed layer component. In support of the conclusion that a mixed layer component might be present, it is of note that Weaver and Pollard have noted the likelihood of the presence of impurities and poorly characterized mixed-layer components in "pure" illites. Moreover, the X-ray diffraction patterns for the "illite" analyzed in the sidewall core samples also had revealed some mixed-layering with a swelling clay, presumably smectite. Finally, it was seen that the "illitic factor" in the r-mode factor analysis was heavily loaded with divalent cations Fe, Mg, Ca which may represent a mixed layer component. Thus, the minerals were characterized as generally being of typical composition, with the exception of the illite, which was of atypical composition and possibly represented a mixed-layer component.

From the mineral quantification and characterization, a depositional environmental analysis, and a production risk analysis, as well as a grain density and refined porosity log, a CEC and corrected water saturation log, and a vanadium and oil API log were accomplished.

Turning to FIG. 5, the percentages of dominant minerals in an investigated formation are seen. The mineral percentages were determined according to the invention as described above. From the mineral quantification and characterizations, a depositional environmental analysis was accomplished. It is known to those skilled in the art that in a deltaic system, the dominant clay type frequently changes from kaolinite in the alluvial environment to illite in the more marine environment. As seen in FIG. 5, the lower depths (1600 to 1750) show a much higher kaolinite to illite ratio than the 1530 to 1600 depth interval. Thus, it was apparent from the derived clay types and abundancies in the investigated borehole that a regressive deltaic environment was indicated, with more alluvial, kaolinitic sediments being overlain by more marine, illitic sediments.

A production risk assessment was also made viable by the mineral quantifications and characterizations. In the sand zones (high quartz) of the investigated borehole, a small (TM 5%) percentage of kaolinite was present. This amount and type of clay represented a very low risk for most production techniques. The major risk involved was the possibility that the kaolinite could be displaced from its physical location in the formation by rapidly flowing fluids, thereby causing the kaolinite to be lodged in pore throats, with a resultant reduction of the permeability of the formation. Such rapid fluid flow was therefore to be avoided during hydrocarbon production.

A second risk in the hydrocarbon production concerned the two uppermost sand bodies (1520 to 1530 and 1550 to 1570) in the formation which may be seen in FIG. 5 to be bounded by iron-rich illitic clays. An acidizing treatment of these sand zones, which would be utilized to dissolve the clays, would very likely release iron ions from these bounding clay bodies. This iron would then precipitate as an iron oxide gel, thereby reducing the permeability of the reservoir sands. Such an acidization treatment therefore was to be avoided during production of the uppermost sand bodies.

The steps shown in FIG. 2 were then utilized to produce a refined porosity log. The grain densities of the different minerals were determined from whole core data. After mineral quantities were calculated at 75 according to the method invention, the matrix density was determined by the equation:

$$\rho_{matrix,d} = \sum_{m=1}^{n} \rho_m w_{m,d} \quad (11)$$

where $\rho_m$ is the grain density of the m'th mineral and $w_m$ is the percentage of the m'th mineral in the formation at depth d. The electron density which is convertible to bulk density $\rho_b$ was determined by the litho-density tool (see commonly owned U.S. Pat. No. 4,048,495 to Ellis) over the depth of the borehole. Porosity was then calculated as a log according to $$\phi_d = \frac{\rho_{b,d} - \rho_{matrix,d}}{\rho_{fluid} - \rho_{matrix,d}} \quad (12)$$

Figure 6:
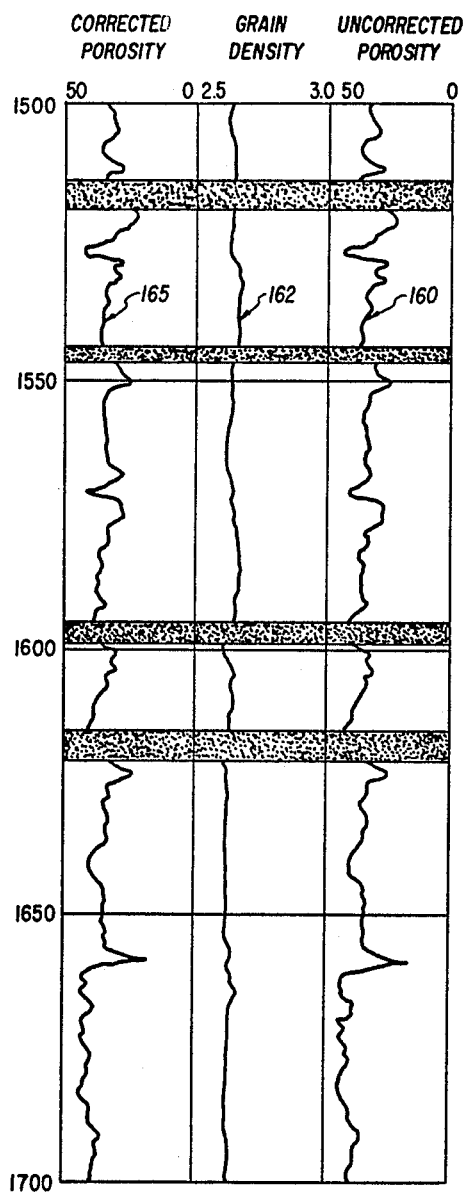
FIG. 6 depicts a porosity log, a matrix density log, and a refined porosity log.

$\rho_{fluid}$ taken as equalling unity. The improved porosity log is seen in FIG. 6, with 160 indicating the porosity log without improvement, and 162 indicating a matrix density log determined according to equation (11) which is used to provide an improved porosity determination log 165 according to equation (12).

In a manner similar to the determination of matrix density, a CEC log of the formation was derived according to $$CEC_d = \sum_{m=1}^{n} CEC_m q_{m,d} \quad (13)$$

where $CEC_m$ is the cation exchange capacity of the m'th clay mineral, and $q_{m,d}$ is the quantity of the m'th clay mineral at depth d. The measured CEC was then converted into a log of water saturation.

Figure 7:
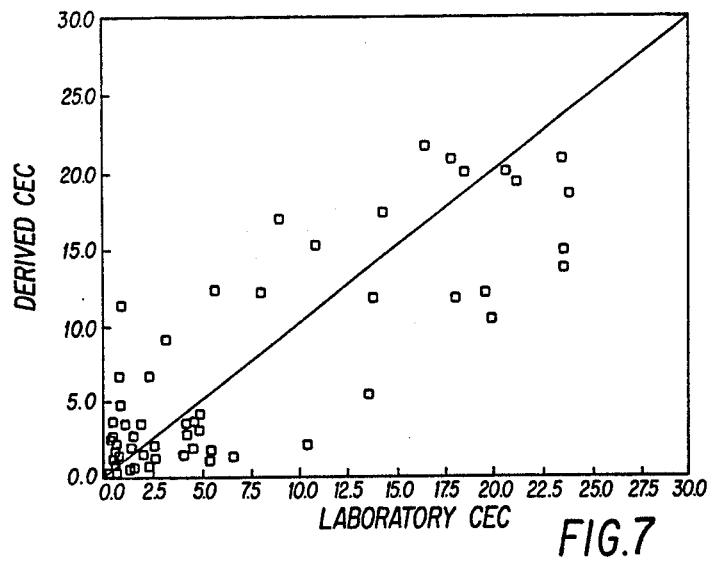
FIG. 7 is a cross-plot of the invention-derived CEC measurements with those of the laboratory-derived CEC measurements.

As a check on the ability of the disclosed method invention to convert elemental log information into a CEC log via the derived element-mineral matrix and resulting mineral quantification, the logging-derived CEC measurement was compared against the laboratory measured CEC of sidewall core for many depth points along the sidewall cored well. Such a comparison is seen in FIG. 7. While the correlation of 0.87 is good, and the absolute CEC differences for each depth are not great, some discrepencies are evident. It is likely that the discrepencies arise from depth shift and from error in the laboratory measurements due to the difficulty in obtaining reproducible laboratory results because of laboratory effectiveness problems in cation replacement, removal of excess cation, as well as possible analytical interferences. Another cause of the scatter arises from the fact that the formation illite was shown to have varying degrees of mixed layering resulting in a non-unique CEC for illite over depth. Nevertheless, as seen in FIG. 7, the agreement is relatively good.

The water saturation and refined porosity logs as so determined were then used to help prepare an oil API gravity log according to the method set forth in FIG. 3. A log of the total vanadium in the formation (formation=matrix+fluid) was made from the information gained by the enchanced resolution gamma spectroscopy tool. As may be seen from FIGS. 4a–c, a substantial portion of the vanadium concentration variance could be associated with clay minerals, particularly with the illitic factor. Thus, to account for the vanadium content of the matrix, it was assumed that the vanadium content was a simple linear function of the kaolinite and illite fractions in the formation. Using multiple regression analysis, variables a and b of step 125 were assigned values of 80 ppm and 250 ppm respectively. From a determination from the method invention of the quantities of kaolinite and illite over depth, a log of the vanadium content in the rock matrix was obtained. The vanadium content of the matrix were then subtracted from the total vanadium content to arrive at the residual vanadium which could be attributed to the hydrocarbons present. Using the bulk density and porosity of the formation at each depth as previously derived, and the oil saturation of the formation at each depth, as derivable from the water saturation log previously provided, the concentration in parts per million of vanadium in the oil was determined according to equation 7 herein (step 135 of FIG. 3). The oil API gravity was then determined according to step 140 of FIG. 3.

Figure 8:
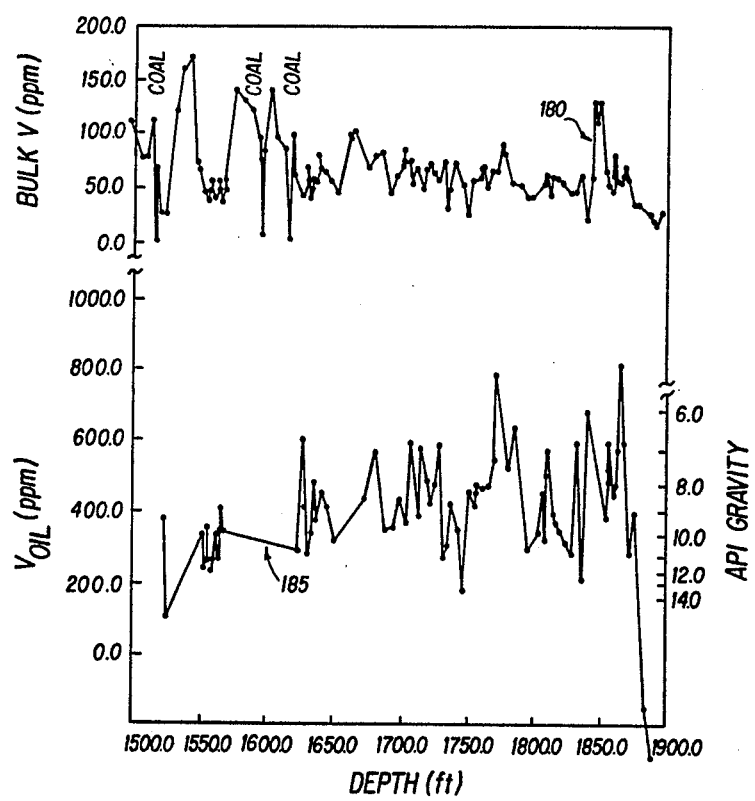
FIG. 8 represents a log depicting the total vanadium content, and the oil vanadium content as a function of borehole depth.

FIG. 8 shows a log 180 of the total vanadium detected from core analysis, and a log 185 of the determined oil vanadium concentrations. The vanadium (oil ppm) results are in good agreement with values reported for nearby wells and for the single oil sample recovered by a fluid sampler tool. The fluid sampler tool sample, from a depth of 1677 feet, was analyzed and had a vanadium concentration of 390 ppm. Concentrations of 400–410 ppm had been reported in nearby wells. These values are essentially equivalent to the vanadium (oil ppm) computed and indicate the general soundness of the technique.

In sum, then, an element-mineral transform matrix was set up using factor analysis and multiple linear regression techniques on sidewall core data from one borehole. In order to determine mineral quantities and to characterize the dominant minerals of the formation adjacent the borehole, different tools were run in an investigated well to provide elemental concentration information. The elemental information provided by the logs was then input into the element-mineral transform matrix, and mineral quantities were determined. The minerals were further characterized through multiple regression analysis techniques. From the mineral quantification and characterization, a depositional environmental analysis and production risk analysis were performed. Using the mineral quantities and characteristics, an electron density log, and a look-up chart for grain densities of particular minerals, matrix density and refined porosity logs were made. From the mineral quantities and characteristics, and a matrix density log, CEC and corrected water saturation logs were made. From the mineral quantities and characteristics, a vanadium enhanced resolution spectroscopy log, and from porosity and water saturation logs, an oil API log was made. Finally, from the mineral quantification and a silicon log, coal zones were detected.

By using the element-mineral transform matrix from the first borehole, the quantities of dominant minerals in a borehole located in proximity thereto were determined by logging and then inputting the elemental concentration data into the said matrix. Mineral quantities were determined and the minerals were further characterized. From the mineral quantification and characterization, an oil API log, a depositional environmental analysis and other new and improved results were accomplished.

Figure 9A:
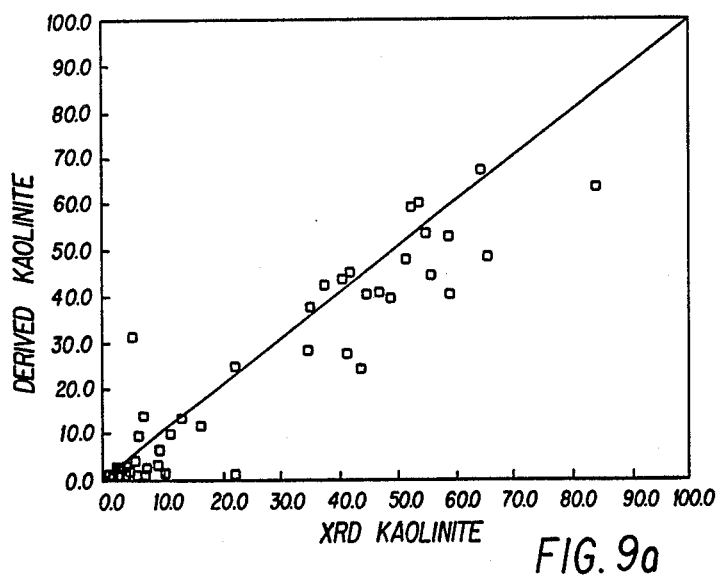
FIGS. 9a through 9h are cross plots of laboratory-derived mineral quantity measurements versus log-derived mineral quantity measurements.
Figures 9B, 9C:
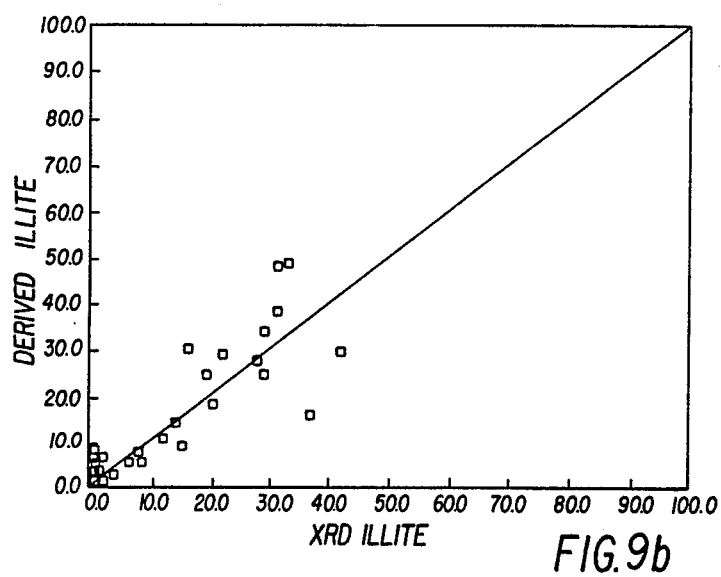
Figure 9D:
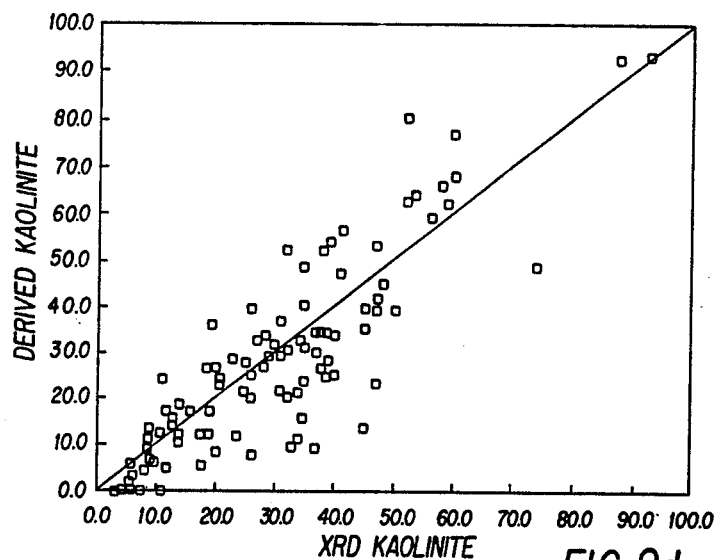
Figure 9E:
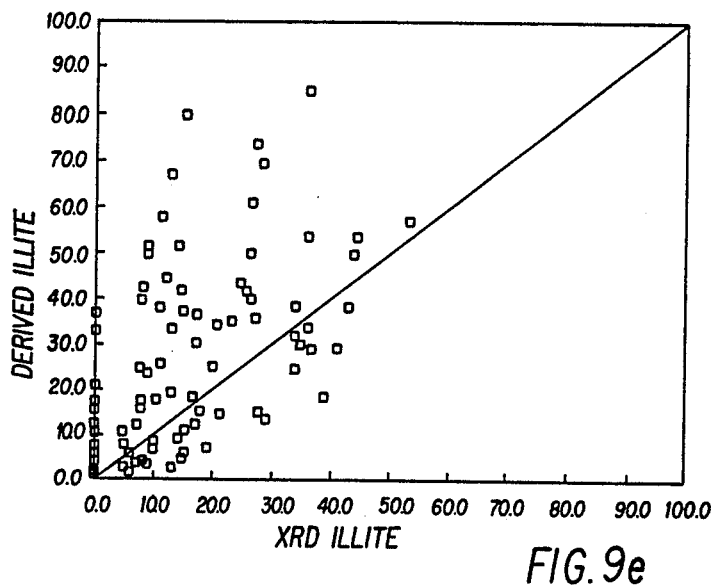
Figure 9F:
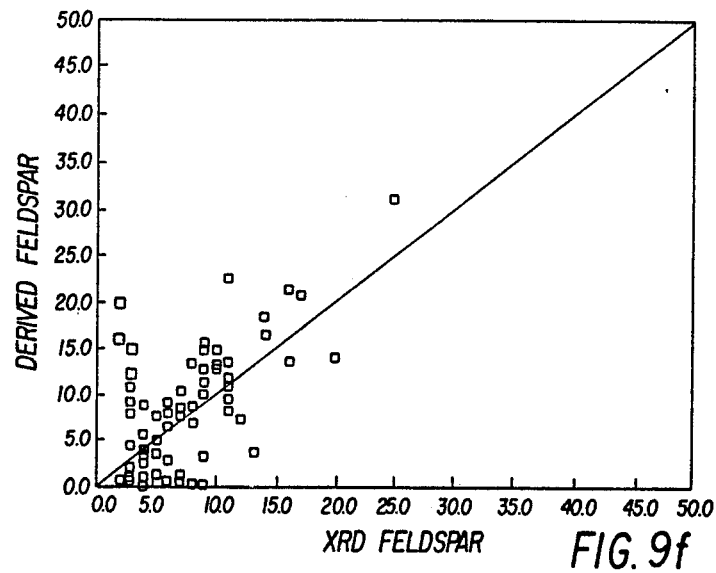

The test of the suitability of the invention was how well the mineral weight percentages (as determined in the lab) could be reproduced from the log concentration determined for the index elements potassium, iron and aluminium for the investigated wells. FIGS. 9a–c show mineral weights percentages measured by X-ray diffraction crossplotted against those derived by the instant invention for the borehole from which the element-mineral matrix was derived. The figures clearly show good agreement, except for very low concentrations which may simply reflect the large relative error in X-ray diffraction techniques at those levels. FIGS. 9d-f show, for the second borehole, mineral weight percentages measured by X-ray diffraction crossplotted against those derived by the instant invention using the element-mineral transform matrix previously derived from the first borehole. While good agreement is found, clearly there is more scatter, especially for the illite as seen in FIG. 9e. Some of this scatter might be explained by depth shift and the mixed layering nature of the illite. However, another factor which might account for more error was the fact that the X-ray diffraction analysis technique was changed and was perhaps less accurate.

Figure 9G:
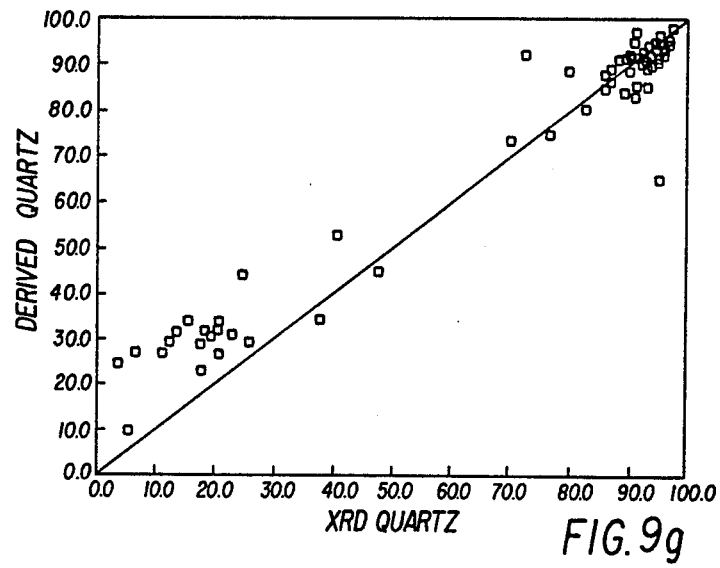
Figure 9H:
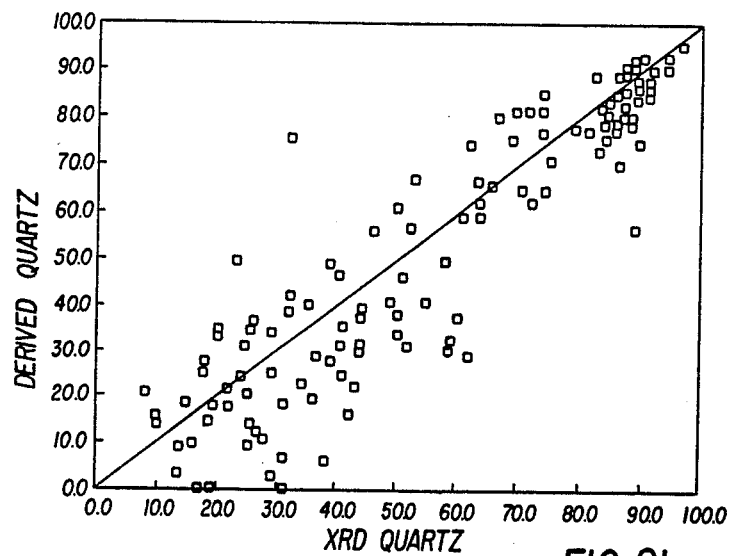

As a further test of the validity of the invention, FIGS. 9g and 9h show the X-ray diffraction measurements of quartz plotted against the residual from the geochemical model, i.e., unity minus the sum of derived kaolinite, illite, and feldspar percentages for the two boreholes. Again, there is good agreement; not only are very shaly sections well separated from the high quartz sand zones, but less shaly sands are also well quantified in quartz.

Figure 9I:
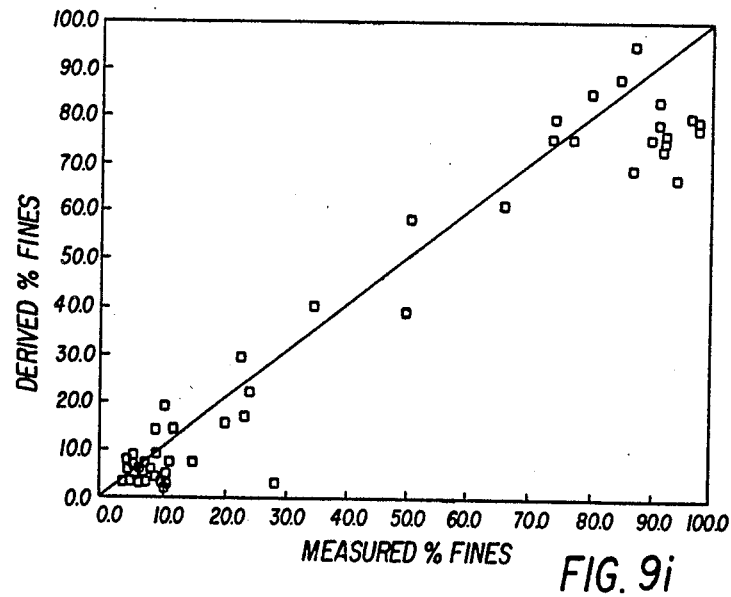
FIG. 9i is a cross plot of laboratory-derived fines measurements versus log-determined fines measurements.

Finally, it may be expected that a correlation would exist between the sum of the derived kaolinite plus illite fractions and the measured fines fraction because the fines (less than 20 micron) fraction of the formation is dominated by the clay minerals, as indeed are most sedimentary sequences. However, this estimation should be expected to underestimate the measured fines since it does not include fine quartz and other minerals which may be present. FIG. 9i is a cross-plot of the measured versus the derived fines fraction and shows that the instant invention gives an excellent characterization of the shale volume fines present. The fines fraction as derived by the invention provides an excellent measurement of the shale volume, the well logging parameter $V_{sh}$. The correlation coefficient between measured and derived percent fines is 0.98. Moreover, as aforementioned, the CEC measurements also correlated well.

Thus, the method invention proved to be capable of producing an accurate characterization and quantitative description of the major lithological components of the formation.

There has been described and illustrated herein, methods in accordance with the present invention for determining from log data the quantities of minerals (values of attributes) in a formation and the characteristics of those minerals, as well as methods for further using the method inventions to derive new and improved results. However, while particular embodiments of the present invention have been utilized and described, it is intended that the invention be broad in scope and that the specification be read likewise. Thus, while the terms "logs" and "logging" are utilized, they are not intended to be limiting in any manner. The terms are intended to encompass the gathering of data at a single depth station, multiple stations or during continuous movement of the tool, and to include all data processing and data transfer techniques known in the borehole logging arts. Also, while much of the invention has been described as utilizing a "transform matrix", other techniques such as simultaneous equations may be utilized in lieu of the matrix to accomplish the stated objectives. Indeed, the utilized transform need not be restricted to linear systems. Finally, it is to be stressed that it is not intended that the invention be limited to determining mineral quantities. Minerals, while important attributes of a formation, are not the only attributes. Likewise, elements need not be the only factor analysis inputs nor the only indexers of attributes, even though they may be the most important. Therefore, it will be apparent to those skilled in the art that other changes and modifications may be made to the invention as described in the specification without departing from the spirit and scope of the invention as so claimed.

I claim:

1. A method for investigating, through borehole measurements, an earth formation traversed by a borehole comprising:
   (a) making measurements in said borehole at least by specroscopy of nucelar radiation artifically induced in said formation;
   (b) determining, from said measurements, concentrations of a plurality of elements in said formation;
   (c) quantifying a plurality of attributes of said formation, including at least one clay mineral, by operating with a single-pass element-attribute transform on said elemental concentrations; and
   (d) producing a tangible record of the quantities of said attributes.

2. The method of claim 1, wherein said element-attribute transform is an element-attribute transform matrix.

3. The method of claim 1, wherein said attributes comprise minerals in said formation.

4. The method of claim 3, further comprising quantifying at least one element in said formation in accordance with a predetermined function of the quantities of said minerals.

5. The method of claim 4, wherein said quantified element is different from said elements determined by logging.

6. The method of claim 1, further comprising: (e) multiplying the quantity of each said attribute obtained at step (c) by a respective predetermined coefficient; and
   (f) deriving a value for a property of said formation as a function of a sum of products of said multiplication of step (e).

7. The method of claim 1, further comprising deriving a value for a property of said formation in accordance with a predetermined function of the quantities of said attributes.

8. The method of claim 7, wherein said predetermined function includes a value of said formation property for each respective attribute considered alone.

9. The method of claim 8, wherein said attributes comprise minerals in said formation.

10. The method of claim 9, wherein said formation property is cation exchange capacity.

11. The method of claim 9, wherein said formation property is grain density.

12. The method of claim 9, wherein said formation property is thermal neutron capture cross-section.

13. The method of claim 8, wherein said attributes comprise elements in said formation.

14. The method of claim 13, wherein said formation property is thermal neutron capture cross-section.

15. The method of claim 7, wherein said predetermined function includes values representative of degree of correlation between presence of each respective attribute and said formation property.

16. The method of claim 15, wherein said attributes comprise minerals in said formation.

17. The method of claim 16, wherein said formation property is permeability.

18. The method of claim 17, wherein said minerals are at least kaolinite, illite and feldspar.

19. The method of claim 16, wherein said formation property is mean grain size.

20. The method of claim 19, wherein said minerals are at least kaolinite, illite, feldspar, quartz and smectite.

21. A method for investigating, through borehole measurements, an earth formation traversed by a borehole comprising:
(a) determining, by borehole measurements, concentrations of a plurality of elements in said formation;
(b) quantifying a plurality of minerals in said formation by operating with an element-mineral transform on said elemental concentrations;
(c) quantifying at least one element in said formation, other than an element of said element-mineral transform of step (b), in accordance with a predetermined function of the quantities of said minerals; and
(d) producing a tangible record of the quantity of said element.

22. The method of claim 21, wherein said quantified element is different from said elements determined by logging.

23. A method for investigating, through borehole measurements, an earth formation traversed by a borehole comprising:
(a) determining, by borehole measurements, concentrations of a plurality of elements in said formation;
(b) quantifying a plurality of minerals in said formation, including at least one clay mineral, by operating with an element-mineral transform on said element concentrations;
(c) deriving a value for a property of said formation in accordance with a predetermined function of the quantities of said minerals and values of said formation property for each respective material considered alone; and
(d) producing a tangible record of the value of said formation property.

24. A method for investigating, through borehole measurements, an earth formation traversed by a borehole comprising:
(a) determining, by borehole measurements, concentrations of a plurality of elements in said formation;
(b) quantifying a plurality of minerals in said formation, including at least one clay mineral, by operating with an element-mineral transform on said elemental concentrations;
(c) deriving a value for a property of said formation in accordance with a predetermined function of the quantities of said minerals and values representative of degree of correlation between presence of each respective mineral and said formation property; and
(d) producing a tangible record of the value of said formation property.

25. A method for investigating, through borehole measurements, an earth formation traversed by a borehole comprising:
(a) identifying elements and attributes possibly occurring in said formation, in accordance with known geology of the formation traversed by said borehole;
(b) generating a first set of signals representative of a set of relationships between formation attributes and elements and including signals representative of elemental concentrations;
(c) modifying said first set of signals, including inversion of said set of relationships, in accordance with said identified elements and attributes, to produce a second set of signals representative of an element-attribute transform;
(d) determining, by borehole measurements, the elemental concentrations of said elements at one or more depths of said borehole in said formation;
(e) quantifying said attributes for one or more depths of said borehole by applying said second set of signals to said elemental concentrations; and
(f) producing a tangible record of the quantities of said attributes.

26. The method of claim 25, further comprising: (g) after step (e), repeating steps (c) and (e) wherein said modifying of said first set of signals of step (c) includes further modifying said first set of signals based upon comparison of said quantified attributes and other measurements obtained in said formation.

27. The method of claim 25, wherein said element-attribute transform is an element-attribute transform matrix.

28. The method of claim 25, wherein said attributes comprise minerals in said formation.

29. The method of claim 28, further comprising quantifying at least one element in said formation in accordance with a predetermined function of the quantities of said minerals.

30. The method of claim 29, wherein said quantified element is different from said elements determined by logging.

31. The method of claim 25, further comprising deriving a value for a property of said formation in accordance with a predetermined function of the quantities of said attributes.

32. The method of claim 31, wherein said predetermined function includes a value of said formation property for each respective attribute considered alone.

33. The method of claim 32, wherein said attributes comprise minerals in said formation.

34. The method of claim 33, wherein said formation property is cation exchange capacity.

35. The method of claim 33, wherein said formation property is grain density.

36. The method of claim 33, wherein said formation property is thermal neutron capture cross-section.

37. The method of claim 32, wherein said attributes comprise elements in said formation.

38. The method of claim 37, wherein said formation property is thermal neutron capture cross-section.

39. The method of claim 31, wherein said predetermined function includes values representative of degree of correlation between presence of each respective attribute and said formation property.

40. The method of claim 39, wherein said attributes comprise minerals in said formation.

41. The method of claim 40, wherein said formation property is permeability.

42. The method of claim 40, wherein said formation property is mean grain size.

43. A method for investigating, through borehole measurements, an earth formation traversed by a borehole comprising:
making measurements in said borehole and thereby determining concentrations of a plurality of elements in said formation, at least one of said elements being iron;

determining the permeability of said formation at a depth in said borehole in accordance with a predetermined function of said determined elemental concentrations in said formation; and providing a tangible record of said permeability.

44. The method of claim 43, wherein said predetermined function incorporates a plurality of components related to the concentrations of said elements in a plurality of minerals and expressing permeabiity as a function of said elemental concentrations in said formation.

45. The method of claim 44, wherein said function includes a transform relating elemental concentrations to mineral quantities and wherein said permeability determining step comprises:

applying said transform to said elemental concentrations to quantify minerals in said formation, and determining the permeability of said formation according to a predetermined function of the quantities of said minerals.

46. The method of claim 45, wherein said minerals include kaolinite, illite and feldspar.

47. The method of claim 1, wherein said clay mineral comprises one of illite and kaolinite.

48. A machine-implemented method for investigating, through borehole measurements, an earth formation traversed by a borehole comprising:

(a) identifying elements and attributes possibly occurring in said formation, in accordance with known geology of the formation traversed by said borehole;

(b) specifying an initial matrix relating a predetermined number n of elements to the same number n of formation attributes and containing $n^2$ components;

(c) modifying, in accordance with said identified elements and attributes, said initial matrix by addition and/or deletion of element-attribute pairs and associated components;

(d) inverting said modified matrix to produce an element-attribute transform matrix;

(e) determining, by borehole measurements, the elemental concentrations of said elements at one or more depths of said borehole in said formation;

(f) qualifying said attributes for one or more depths of said borehole by applying said element-attribute transform to said elemental concentrations; and (g) producing a tangible record of the quantities of said attributes.

* * * * *